US011782713B1

(12) United States Patent
Shah et al.

(10) Patent No.: US 11,782,713 B1
(45) Date of Patent: Oct. 10, 2023

(54) SECURITY VULNERABILITY MITIGATION USING ADDRESS SPACE CO-EXECUTION

(71) Applicant: Amazon Technologies, Inc., Seattle, WA (US)

(72) Inventors: Amit Shah, Dresden (DE); Jan Hendrik Schoenherr, Dresden (DE); Karimallah Ahmed Mohammed Raslan, Dresden (DE); Marius Hillenbrand, Dresden (DE); Filippo Sironi, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 16/552,772

(22) Filed: Aug. 27, 2019

(51) Int. Cl.
*G06F 9/30* (2018.01)
*G06F 9/50* (2006.01)
*G06F 9/48* (2006.01)
*G06F 9/54* (2006.01)
*G06F 9/455* (2018.01)

(52) U.S. Cl.
CPC ........ *G06F 9/3009* (2013.01); *G06F 9/45558* (2013.01); *G06F 9/4881* (2013.01); *G06F 9/5044* (2013.01); *G06F 9/545* (2013.01); G06F 2009/4557 (2013.01); G06F 2209/5018 (2013.01)

(58) Field of Classification Search
CPC .. G06F 9/3009; G06F 9/4881; G06F 9/45558; G06F 9/5044; G06F 9/545; G06F 2209/5018; G06F 2009/4557
See application file for complete search history.

(56) References Cited

U.S. PATENT DOCUMENTS

| 6,658,447 | B2 | 12/2003 | Cota-Robles |
| 7,493,436 | B2 | 2/2009 | Blackmore et al. |
| 7,698,707 | B2 | 4/2010 | Accapadi et al. |
| 7,992,156 | B1* | 8/2011 | Wang ............... G06F 21/565 713/188 |
| 8,136,111 | B2 | 3/2012 | Mall et al. |
| 8,145,797 | B2 | 3/2012 | Floyd |
| 9,785,557 | B1* | 10/2017 | Frey ............... G06F 12/0837 |
| 2003/0033510 | A1* | 2/2003 | Dice ............... G06F 9/3842 712/E9.05 |
| 2004/0215932 | A1 | 10/2004 | Burky et al. |
| 2004/0268325 | A1* | 12/2004 | Moore ............ G06F 11/3644 717/140 |
| 2005/0015702 | A1* | 1/2005 | Shier ............. G06F 11/2273 714/776 |

(Continued)

OTHER PUBLICATIONS

Dhanghee Jung, et al., Adaptive execution techniques for SMT multiprocessor architectures:, PPoPP'05, ACM, Jun. 15-17, 2005, pp. 236-246.

(Continued)

*Primary Examiner* — Adam Lee
(74) *Attorney, Agent, or Firm* — Robert C. Kowert; Kowert, Hood, Munyon, Rankin & Goetzel, P.C.

(57) ABSTRACT

A first set of instructions, which is provided access to a first address space, is scheduled for execution at a first hardware thread of a processor. Prior to executing an instruction of a second set of instructions, which accesses a second address space, at the first hardware thread, a determination is made that the second address space is accessible from a second hardware thread of the processor.

20 Claims, 14 Drawing Sheets

(56) References Cited

U.S. PATENT DOCUMENTS

| | | | |
|---|---|---|---|
| 2006/0041735 A1* | 2/2006 | Hepkin | G06F 12/1081 |
| | | | 711/E12.067 |
| 2008/0133842 A1* | 6/2008 | Raikin | G06F 12/1491 |
| | | | 711/E12.001 |
| 2008/0184240 A1* | 7/2008 | Franaszek | G06F 9/4881 |
| | | | 718/102 |
| 2008/0313417 A1* | 12/2008 | Kim | G06F 21/55 |
| | | | 711/163 |
| 2010/0082867 A1* | 4/2010 | Adachi | G06F 13/26 |
| | | | 710/261 |
| 2011/0296421 A1* | 12/2011 | Gschwind | G06F 9/3842 |
| | | | 718/102 |
| 2012/0222035 A1* | 8/2012 | Plondke | G06F 9/4881 |
| | | | 718/103 |
| 2014/0026138 A1* | 1/2014 | Itou | G06F 9/522 |
| | | | 718/102 |
| 2014/0259117 A1* | 9/2014 | Wachendorf | G06F 21/57 |
| | | | 726/4 |
| 2015/0013008 A1* | 1/2015 | Lukacs | G06F 21/566 |
| | | | 726/24 |
| 2015/0022538 A1* | 1/2015 | Munshi | G06F 9/5027 |
| | | | 345/522 |
| 2015/0178219 A1* | 6/2015 | Aslot | G06F 9/5038 |
| | | | 711/133 |
| 2016/0224509 A1* | 8/2016 | Moudgill | G06F 9/30036 |
| 2016/0267000 A1* | 9/2016 | Rose | G06F 9/528 |
| 2016/0283237 A1* | 9/2016 | Pardo | G06F 9/526 |
| 2016/0371123 A1* | 12/2016 | Zhang | G06F 9/4843 |
| 2017/0109189 A1* | 4/2017 | Swidowski | G06F 21/554 |
| 2017/0212811 A1* | 7/2017 | Kashnikov | G06F 16/113 |
| 2018/0011711 A1* | 1/2018 | Ray | G06F 9/3824 |
| 2018/0137136 A1* | 5/2018 | Altaparmakov | G06F 3/0643 |
| 2018/0285106 A1* | 10/2018 | Appu | G06F 1/3225 |
| 2018/0287949 A1* | 10/2018 | Kumar | G06F 1/206 |
| 2019/0138720 A1* | 5/2019 | Grewal | G06F 9/3863 |
| 2019/0196982 A1* | 6/2019 | Rozas | G06F 12/145 |
| 2020/0133873 A1* | 4/2020 | Williams | G06F 12/0811 |
| 2020/0150960 A1* | 5/2020 | Williams | G06F 9/38 |
| 2020/0174931 A1* | 6/2020 | Williams | G06F 12/0833 |
| 2020/0183696 A1* | 6/2020 | Williams | G06F 12/0811 |
| 2020/0183843 A1* | 6/2020 | Williams | G06F 12/0842 |
| 2020/0201780 A1* | 6/2020 | Williams | G06F 12/0842 |
| 2020/0201786 A1* | 6/2020 | Ouziel | G06F 12/0828 |
| 2020/0301735 A1* | 9/2020 | Accapadi | G06F 9/4837 |
| 2020/0327367 A1* | 10/2020 | Ma | G06K 9/00664 |
| 2020/0356409 A1* | 11/2020 | Williams | G06F 12/0811 |
| 2020/0364375 A1* | 11/2020 | Bottomley | G06F 21/554 |
| 2020/0409771 A1* | 12/2020 | Williams | G06F 9/4812 |

OTHER PUBLICATIONS

Nael Abu-Ghazaleh, et al., "How the Spectre and Meltdown Hacks Really Worked", Retrieved from https://spectrum.ieee.org/computing/hardware/how-the-spectre-and-meltdown-hacks-really-worked on Jun. 3, 2019, pp. 1-18.

Microsoft Tech Community, Hyper-V HyperClear Mitigation for L1 Terminal Fault, Retrieved from https://techcommunity.microsoft.com/t5/Virtualization/Hyper-V-HyperClear-Mitigation-for-L1-Terminal-Fault/ba-p/382429 on Jun. 21, 2019, pp. 1-11.

Deborah T. Marr, et al., "Hyper-Threading Technology Architecture and Microarchitecture", Intel Technology Journal Q1, 2002, pp. 1-12.

Alexander Chartre, KVM Address Space Isolation, Retrieved from https://lwn.net/Articles/788273/ on Jun. 21, 2019, pp. 1-6.

Andy Greenberg, "Meltdown Redux: Intel Flaw Lets Siphon Secrets From Millions of PCS", Retrieved from https://www.wired.com/story/intel-mds-attack-speculative-execution-buffer/ on Jun. 3, 2019, pp. 1-20.

Microsoft, "Protect your Windows devices against speculative execution side-channel attacks", Retrieved from https://support.microsoft.com/en-us/help/4073757/protect-windows-devices-from-speculative-execution-side-channel-attack an Jun. 5, 2019, pp. 1-10.

Jochen Liedtke, et al., "Lazy Process Switching", Proceedings Eighth Workshop on Hot Topics in Operating Systems, IEEE, 2001, pp. 13-16.

Alexandre Chartre, "LKML: Kernel Address Space Isolation", Retrieved from https://lkml.org/lkml/2019/7/11/351 on Jul. 20, 2019, pp. 1-5.

Unknown, "Cache speulation Side-Channels", Whitepaper, Retrieved from https://developer.arm.com/documentation/102816/0205/, dated Jun. 2020, version 2.5, pp. 1-21.

U.S. Appl. No. 17/936,783, filed Sep. 29, 2022, Nathan Yong Seng Chong, et al.

* cited by examiner

```
┌─────────────────────────────────────────────────────────────────────────────┐
│ Generate a mapping of a data object DO1, access to which requires privilege │
│ level PL1, from address space AS1 (e.g., an address space of a kernel or a  │
│ hypervisor) to an address space AS2 (e.g., an application's address space   │
│ or a compute instance's address space) which contains other data objects    │
│ which require a different privilege level PL2      1201                     │
└─────────────────────────────────────────────────────────────────────────────┘
                                      │
                                      ▼
┌─────────────────────────────────────────────────────────────────────────────┐
│ Execute a first stream of instructions (IS1), which has access to AS2, at a │
│ hardware thread HT1 of an SMT processor      1204                           │
└─────────────────────────────────────────────────────────────────────────────┘
                                      │
                                      ▼
┌─────────────────────────────────────────────────────────────────────────────┐
│ Determine, e.g., at an operating system entry point or a hypervisor entry   │
│ point, that a second stream of instructions IS2, which requires access to   │
│ an object (e.g., DO2) within a different address space from AS2 (e.g.,      │
│ address space AS1) is to be scheduled at HT1      1207                      │
└─────────────────────────────────────────────────────────────────────────────┘
                                      │
                                      ▼
┌─────────────────────────────────────────────────────────────────────────────┐
│ Obtain an indication, before scheduling IS2 at HT1, that the different      │
│ address space has been made accessible from other hardware threads (e.g.,   │
│ thread HT2) of the SMT processor      1210                                  │
└─────────────────────────────────────────────────────────────────────────────┘
                                      │
                                      ▼
┌─────────────────────────────────────────────────────────────────────────────┐
│           Execution instructions of IS2 at HT1      1213                    │
└─────────────────────────────────────────────────────────────────────────────┘
```

*FIG. 12*

SECURITY VULNERABILITY MITIGATION USING ADDRESS SPACE CO-EXECUTION

BACKGROUND

Many modern computer applications require substantial amounts of computation capacity. Many types of multi-processor or parallelized computer system architectures have been designed to enable numerous portions of a given application, or portions of different applications, to be executed concurrently at a given computing device. One such approach is called simultaneous multi-threading (SMT). In SMT, instructions from two or more streams (e.g., different software threads of a single multi-threaded software process, or threads of different processes) may be issued for execution in each cycle of a processor's clock. That is, at an SMT processor, parallelism may be exploited all the way down to very low levels of hardware operations—e.g., at the level of instruction issue slots in a given clock period. Depending on the application, substantial increases in utilization levels of low-level processor resources, instruction throughput and overall application performance may be achieved using SMT processors. SMT, which may also be referred to as hyper-threading, has become increasingly popular for compute servers in recent years, including for servers used as virtualization hosts in cloud computing environments.

The advent of virtualization technologies has provided benefits with respect to managing large-scale computing resources for many customers with diverse needs, allowing various computing resources to be efficiently and securely shared by multiple customers. For example, virtualization technologies may allow a single physical computing machine to be shared among multiple users at a computing service by providing each user with one or more compute instances (e.g., guest virtual machines) hosted by the single physical computing machine. Each such compute instance may be regarded as a software simulation acting as a distinct logical computing system. Virtualization management software such as a hypervisor may be employed as an intermediary between physical hardware components (including SMT processors) and the virtualized representations of the hardware provided to the compute instances.

BRIEF DESCRIPTION OF DRAWINGS

FIG. 12 is a flow diagram illustrating aspects of operations that may be performed to enforce address space co-execution at a processor implementing simultaneous multi-threading, according to at least some embodiments.

Figure 1:
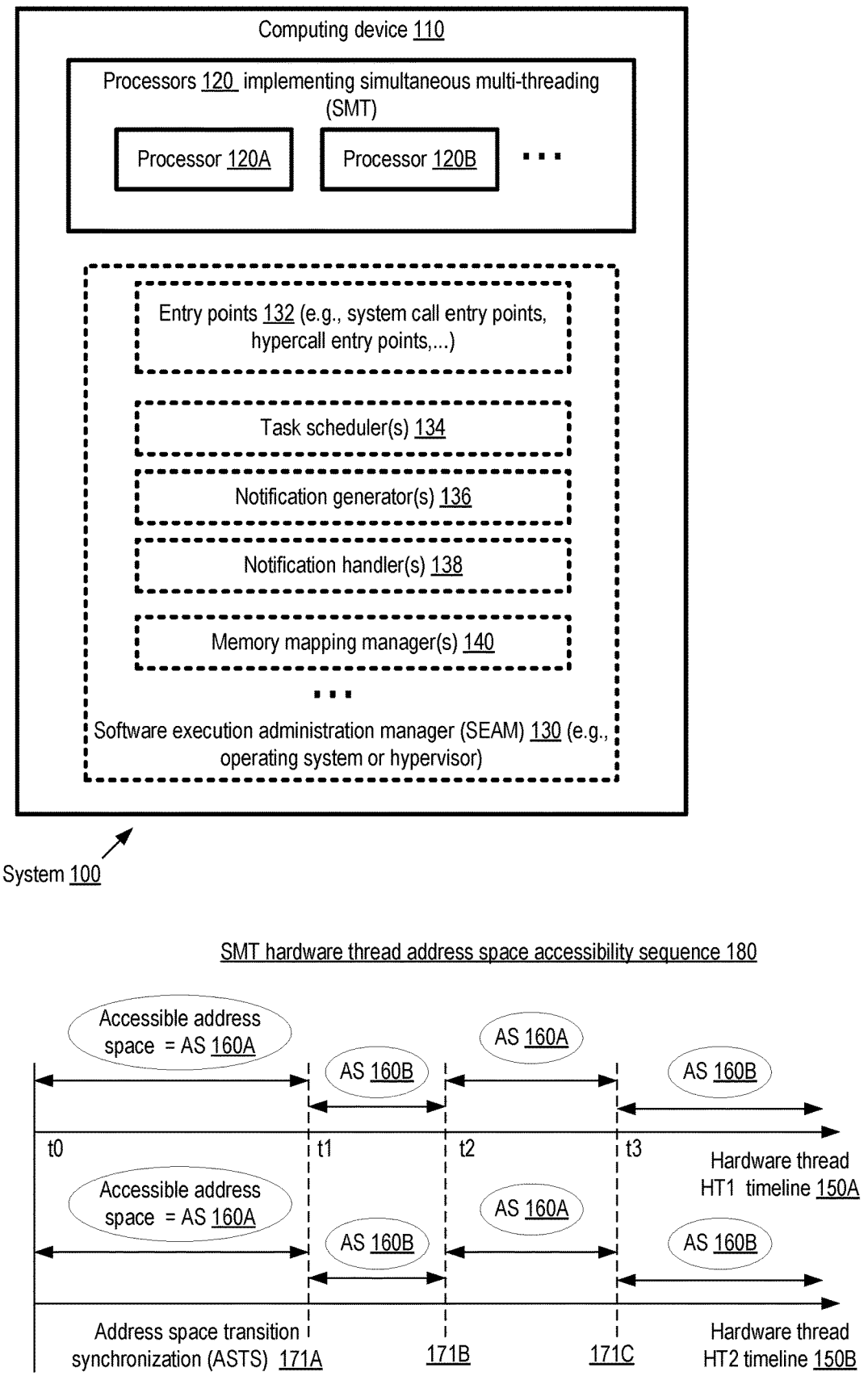
FIG. 1 illustrates an example system environment in which address space co-execution may be used to mitigate security vulnerabilities at processors that support simultaneous multithreading, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for using an address space transition management technique, referred to herein as address space co-execution, to mitigate potential security vulnerabilities at computing devices equipped with processors that implement simultaneous multi-threading (SMT). Such a processor, which may be referred to as an SMT processor or a hyper-threaded processor, may comprise a plurality of hardware threads of execution, each of which may be used to schedule a respective stream of program instructions concurrently. The hardware threads (also referred to as "sibling threads" or "logical processors" in some environments) each can be a physical processing unit or core that is recognized as a logical processor and can run code for a software thread. The term "address space co-execution" may be used to refer to techniques that ensure that during an interval in which a given instruction stream executes at one hardware thread of an SMT processor, and has access to a given address space, any other instruction stream scheduled for execution at another hardware thread of the same SMT processor has access to the same address space. That is, instruction streams are only allowed to "co-execute" at respective hardware threads of a given SMT processor if they have permission to access the same data; as a result, it becomes impossible for data objects of one instruction stream to be accessed by other instruction streams running at the SMT processor which are not already authorized to do so.

In recent years, a number of vulnerabilities associated with the capture or access of data of one instruction stream by another instruction stream running on the same processor have been identified, using techniques such as micro-architectural data sampling (MDS), L1TF (level-1 cache terminal fault) and the like. Such techniques are sometimes referred to as "side-channel" attacks. Some of the vulnerabilities are in a sense "built-in" in to the processor hardware architecture (e.g., in the architecture of super-scalar SMT processors at which speculative execution and other advanced techniques are used to improve performance), and as a result are not easy to mitigate or resolve in software without significant performance reduction. A system at which address space co-execution is employed at SMT processors, however, may be able to eliminate some types of data capture attacks in various embodiments, since the only sets of instructions that can potentially access each other's data are those that are already authorized to access each other's data. Furthermore, as a result of mapping some data objects across address spaces as discussed below, and thus reducing the frequency of address space transitions and associated synchronization operations, the performance overhead associated with address space co-execution may be minimized in various embodiments.

In various embodiments, after some number of instructions of an instruction stream IS1 have run at a given hardware thread HTj of an SMT processor, and accessed data objects within a particular address space AS-1 while running at HTj, a determination may eventually be made that the next stream of instructions IS2 to be run at HTj will need access to data objects within a different address space AS-2. In response to such a determination, an address space synchronization operation may be initiated in various embodiments. The synchronization operation may ensure that before any objects of AS-2 are accessed from HTj, access to AS-2 has also been provided to or obtained for instructions that may be scheduled to run at other hardware threads HTk, HTl, etc., of the SMT processor. A number of different approaches towards implementing such a synchronization operation may be used in different embodiments. For example, in one embodiment, an active synchronization technique may be employed in which an interrupt or notification is sent (e.g., from HTj to individual ones of the other hardware threads (e.g., HTt) to cause respective address space transitions at the other hardware threads. In another embodiment, a more passive technique may be used, in which the execution of instructions that are to access the different address space AS-2 may be deferred at HTj until a notification is received from the other hardware threads indicating that the other hardware threads have transitioned to AS-2 (i.e., without being prompted/requested to do so).

According to some embodiments, as mentioned above, memory mapping operations of various types may be employed to reduce the requirements for address space transitions for which synchronizations are required. For example, a data structure that requires a privileged access level or permission (e.g., an operating system administrator access level) may be dynamically mapped to user space, so that if and when a system call that accesses the data structure is invoked from user space, an address space transition would not be required. Using such memory mappings, the overhead associated with address space transition synchronization operations may be reduced in various embodiments, and the probability that an given software thread or program has to "spin" as a result of an address space transition may be reduced. In at least some embodiments, the memory may be mapped in read-only mode—e.g., when a kernel data structure is mapped to a user address space, reads (but no writes) may be allowed from an instruction stream accessing the user address space.

As one skilled in the art will appreciate in light of this disclosure, certain embodiments may be capable of achieving various advantages and practical applications/benefits, including some or all of the following: (a) significantly reducing the probability of data leaks which may otherwise be possible due to inherent vulnerabilities of at least some SMT hardware processor architectures, (b) improving the utilization levels and performance levels achieved at servers that employ SMT processors relative to the utilization levels and performance levels that may have been obtained if other software techniques (such as privilege domain co-execution) to mitigate the hardware vulnerabilities were employed, and/or (c) enhancing the security of applications run on multi-tenant virtualization hosts of virtualized computing services implemented at provider networks or cloud computing environments.

According to at least some embodiments, a system may comprise a computing device with a memory and a processor. The processor may support simultaneous multi-threading—e.g., the processor may comprise a plurality of hardware threads including a first hardware thread and a second hardware thread. The memory may include instructions that upon execution on the processor cause the computing device to generate a mapping of a first data object from a first address space to a second address space. Access to the first data object may require a first privilege level (e.g., a kernel or administrative privilege level), while access to another data object of the second address space may require a second privilege level (e.g., a user privilege level or an application program privilege level). A first stream of instructions may be scheduled and executed at the first hardware thread, and provided access to a plurality of data objects within the second address space, including the first data object (which is mapped to the second address space) as well as the second data object. A determination may be made in various embodiments that a second stream of instructions, which accesses a third object which lies within the first address space (and is not mapped to the second address space), is to be executed at the first hardware thread. Such a determination may be made, for example, when an entry point of an operating system (e.g., a system call entry point) or an entry point of a hypervisor call is reached during the execution of a program's software. Other entry points at which such determinations may be made in at least some embodiments may include, for example, interrupt handlers, exception handlers and the like. Prior to causing execution of the second stream of instructions at the first hardware thread, in various embodiments an indication may be obtained that the first address space is accessible from instructions running at or scheduled at the second hardware thread. Note that in embodiments in which the processor comprises more than two hardware threads, including for example a third hardware thread, an indication may be obtained that all the other hardware threads (including the third hardware thread) have access to the first address space before the second stream of instructions is executed. After such indications are obtained, the second stream of instructions may be executed at the first hardware thread in various embodiments, thus ensuring that instructions that run at the first and second hardware threads (as well as any other hardware threads) have access to the same address space.

According to some embodiments, an indication of a trusted group of software programs, software processes or software threads may be obtained, e.g., via one or more programmatic interactions at a computing service at which address space co-execution techniques of the kind introduced above is implemented. A client of such a service may, for example, indicate that a collection of processes including process P1 and process P2 belong to a given trusted group TG1, and that instruction streams of the processes of TG1 should be permitted to run concurrently at hardware threads of a given SMT processor. Accordingly, if the instructions currently running at the first hardware thread of an SMT processor CPU1 of a computing device implement operations of P1, a set of instructions that implement operations of P2 or some other TG1 member may be selected for co-execution at the second hardware thread of the same SMT processor in various embodiments, e.g., by a task scheduler of an operating system. In contrast, the task scheduler may schedule instructions of a process that does not belong to TG1 at a different processor (e.g., CPU2) of the computing device in at least some embodiments.

Address space co-execution techniques of the kind introduced above may be employed at various types of computing devices. In some embodiments, for example, the sets or streams of instructions to be scheduled at a given hardware thread may be identified by a task scheduler of an operating system running at a non-virtualized host. In other embodiments, the sets or streams of instructions to be scheduled at a given hardware thread may be identified by a task scheduler of hypervisor running at a virtualization host. Such a virtualization host may also be used to run a number of compute instances (e.g., guest virtual machines), each of which may in turn comprise a respective operating system instance as well as one or more application programs. In some embodiments, address space co-execution may be implemented at multiple levels at a virtualization host—e.g., at the hypervisor (where the address space transitions are between hypervisor spaces and compute instance spaces), and also at individual ones of the compute instances running at the virtualization host (where the address space transitions are between kernel spaces and user/application spaces).

As mentioned earlier, any of a variety of techniques may be employed to enforce address space co-execution in different embodiments. According to one technique, when the address space to be accessed by a subsequent set of instructions at a given hardware thread is to change, e.g., from AS-1 to AS-2, a request to cause AS-2 to also be made accessible from other hardware threads may be sent from the given hardware thread, e.g., using one or more interrupts or other notification mechanisms (which indicate the impending address space transition at the given hardware thread) to immediately or near-immediately cause the address space transition at the other hardware threads. According to another, somewhat more passive technique, scheduling of instructions that are to access AS-2 objects at the given hardware threads may be deferred until a notification is received that instructions that access AS-2 objects are also scheduled for execution at the other hardware threads, and a request/notification/interrupt to actively cause the address space transition at the other hardware threads may not be sent.

A few examples of the uses and benefits of address space co-execution, e.g., in the context of computing devices employing variants of the Linux operating system and (in cases where guest virtual machines are instantiated) the KVM (Kernel-based Virtual Machine) technology for virtualization management (e.g., hypervisor functionality) are presented below.

In the first example, we first consider a baseline scenario in which address space co-execution is not implemented. A version of Linux which supports KPTI (kernel page table isolation) is assumed to be used, and the transition between user and kernel privilege modes is combined with a corresponding address space transition. KVM is used for virtualization management, and the execution of a virtual CPU (vCPU) is triggered from user space via a KVM_RUN ioctl (an input-output control system call) (note that ioctls may also be used for other purposes). A typical sequence of privilege level and address space transitions in the baseline scenario during a particular KVM_RUN ioctl may comprise the following steps or states (with the combinations of privilege level and address space at each step shown in italics):

Baseline scenario step (BSS) 1: [user mode/user address space]: user program issues KVM_RUN ioctl BSS2: [kernel mode/kernel address space]: ioctl gets handled: it is forwarded to KVM, which performs a VM entry BSS3: [guest mode/kernel address space]: guest virtual machine is executed until a VM exit occurs BSS4: [kernel mode/kernel address space]: (a) KVM checks whether the VM exit can be handled within the kernel; (b) if so, VM exit is handled and state BSS3 is re-entered; (c) if not, KVM returns control back to the caller BSS5: [user mode/user address space]

Note that a transition from a given (privilege level/address space) combination to another is not atomic (switching address spaces is only possible in kernel mode). Also, in some versions of Linux to which an extension has been added, the combination in BSS3 may be (guest mode/restricted address space) rather than (guest mode/kernel address space).

To make the above scenario safe with respect to vulnerabilities such as MDS, the transitions from and to kernel mode need to be synchronized with respect to SMT hardware threads (in addition to other steps like flushing architectural buffers). If address space co-execution is employed (and the Linux extension mentioned above is also used), in contrast, it is the transitions from and to kernel address space that need to be synchronized.

In an embodiment on which address space co-execution and mappings of the kind discussed earlier are used, the baseline step sequence referenced above may instead be replaced by the following sequence:

Address space co-execution scenario step (ASCSS) 1: [user mode/user address space]:
user program issues KVM_RUN ioctl ASCSS2: [kernel mode/user address space]: ioctl gets handled: user mapped portion of KVM performs a VM entry ASCSS3: [guest mode/user address space]: guest virtual machine is executed until a VM exit occurs ASCSS4: [kernel mode/user address space]: (a) user mapped portion of KVM checks whether the VM exit can be handled directly; (b) if so, VM exit is handled and state ASCSS3 is re-entered; (c) if not, a determination is made whether additional data is needed to handle the VM exit. If such additional data is needed, an address space transition to the kernel address space is performed (involving synchronization with other SMT hardware threads) and the VM exit is handled; otherwise, the user mapped portion of KVM returns control back to the caller ASCSS5: [user mode/user address space]

In the modified sequence shown above, in the common path (the case where no additional data is needed in step ASCSS4), there are no address space transitions at all, so the overhead of synchronizing the SMT hardware threads is not incurred. The user address space is assumed not to contain any secret data which needs to be protected from a guest. In various embodiments, parts of the KVM code and data (including for example data structures that capture the execution state of a virtual machine) may be mapped to user space, e.g., via one or more higher-level mapping functions that incorporate functionality similar in some respects to internal Linux functions such as copy_pte_range, remap_pfn_range, remap_vmalloc_range, etc. Using such mappings, virtualization operations such as CPUID emulation, MSR (machine specific register) read/write emulation, and (to at least some degree) device emulation may be handled without requiring address space transitions, and hence without incurring synchronization overhead with respect to such transitions.

In a second example of the efficient use of address space co-execution, in some embodiments thread execution state data may be mapped to the user address space (in a scenario which does not necessarily involve virtualization), and context switches between threads of the same process may then be processed without having to switch to the kernel address space and without incurring the overhead of synchronizing the SMT hardware threads. Note that application code does not have to be modified to implement such context switches. Context switch performance may be improved on KPTI-enabled systems (e.g., performance similar to that which could be obtained in systems in which KPTI is not enabled, and hence when KPTI-associated address space transitions were not required) using such mappings.

A third example of efficient address space co-execution, applicable to both virtualization and non-virtualization scenarios in some embodiments, involves the acceptance of certain interrupts without forcing an address space transition to the kernel address space. In such scenarios, interrupts do not require a synchronization before they are handled. For example, some timer interrupts may be handled without synchronization if they are raised at the request of an application. For this, timer related data and system calls are mapped into the user address space in at least some embodiments. This technique is also applicable to device interrupts, e.g., when user space I/O drivers are used and an application is to be notified of incoming data.

Example System Environment

FIG. 1 illustrates an example system environment in which address space co-execution may be used to mitigate security vulnerabilities at processors that support simultaneous multithreading, according to at least some embodiments. As shown, system 100 comprises a computing device 110 which in turn includes one or more processors 120 (such as processors 120A and 120B) implementing simultaneous multi-threading (SMT). Computing device 110 also includes a software execution administration manager (SEAM) 130 responsible for, among other operations, scheduling sequences of program instructions at the hardware threads of the SMT processors 120. A number of different types of SEAMs may be employed in different embodiments, depending on the kinds of applications and workloads to be run at the computing device 110—e.g., in some embodiments, a SEAM may comprise an operating system of a non-virtualized host, while in other embodiments a SEAM may comprise a hypervisor configured to act as an intermediary between hardware elements of the computing device and one or more compute instances such as guest virtual machines. In various embodiments, the computing device 110 may comprise a memory storing program instructions that when execute on or across one or more of the processors 120 implement the functionality of the SEAM 130.

In the embodiment depicted in FIG. 1, each of the SMT processors 120 may comprise one or more hardware threads, and the SEAM 130 may be responsible for implementing address space co-execution with respect to the set of hardware threads of at least one of the processors. As such, before allowing an instruction stream IS1 which is to access an address space AS1 to be run at a given hardware thread HT1 of a given processor 120, components of the SEAM 130 may ensure that the address space AS1 is also accessible from the other hardware thread(s) HT2, HT3, etc. of the same processor 120. SEAM components involved in the implementation of address space co-execution may include, for example, entry points 132 (e.g., system call entry points, virtualization call (hyper-call) entry points, and the like), task scheduler(s) 134, notification generators(s) 136, notification handler(s) 138 and/or memory mapping manager(s) 140. Individual ones of such SEAM components may, for example, be implemented by executing program instructions corresponding to a given set of programs, functions, methods, or the like in various embodiments.

In order to reduce the overhead associated with address space co-execution (which may for example involve spinning at a given hardware thread until access to an address space is obtained at another hardware thread), in at least some embodiments various types of cross-address-space memory mappings may be implemented to enable objects typically accessed in one address space to be accessed from another address space. According to some embodiments, a memory mapping manager 140 subcomponent of the SEAM 130 may generate a mapping of a first data object (DO1) from a first address space (AS1) to a second address space (AS2). In some cases, access to DO1 may require a first privilege level PL1 (e.g., kernel-level or administrative privilege), and access to a second data object DO2 of the second address space AS2 may require a different privilege level (e.g., user or application level privilege). In other cases, a mapping may be generated for a data object DO1 that requires the same privilege level as other objects (e.g., DO2) of the mapping's target address space. Note that address space co-execution may be implemented in at least some embodiments without necessarily performing memory mappings of the kind indicated above.

A first stream of instructions IS1, which has access to the objects within the second address space AS2 (including any mapped objects such as DO1), may be scheduled for execution at a first hardware thread HT1 of a processor 120, e.g., by a task scheduler 134. Such streams of instructions may, for example, comprise part of a software process (e.g., implementing an application program or an administrative program) or thread in various embodiments. A determination may be made, e.g., at least in part at an entry point 132, that a second stream of instructions IS2 which accesses a third data object DO3 of AS1, where DO3 has not been mapped to AS2, is to be scheduled at HT1. Prior to causing an instruction of IS2 to be executed at HT1, an indication that the first address space AS1 is also accessible from another hardware thread HT2 of the processor 120 may be obtained at the SEAM 130, e.g., with the help of a notification handler 138 and/or a notification generator 136. After such an indication is obtained, one or more instructions of IS2 may be scheduled for execution at HT1, and executed at HT1, in various embodiments. In some embodiments, determinations regarding impending changes to address space access requirements may be made at other SEAM components (in addition to entry points 132), such as exception handlers, interrupt handlers (which represent one example of notification handlers 138), VMEXIT handlers (corresponding to transitions between the operations of a virtual machine and a hypervisor), and so on.

Any of several different address space transition synchronization techniques may be employed in different embodiments to ensure that the other hardware thread HT2 has access to the same address space as HT1. In one embodiment, a notification generator 136 (e.g., an interrupt generator) may direct an interrupt to the instruction stream (if any) running at HT2, in effect requesting an immediate (or near-immediate) change of address space access at HT2. In another embodiment, such a notification may not be sent, e.g., under an implicit assumption that the transition to AS1 is very likely to occur soon anyway at HT2, and a notification handler 138 may be used to obtain a message or notification when another instruction stream (IS3) with access to AS1 is scheduled at HT2. Note that before IS3 is scheduled at HT2, in the depicted embodiment, the task scheduler 134 may verify that the instructions scheduled for HT1 (in this case, the instructions of IS2) also have access to AS1.

FIG. 1 also illustrates an example address space accessibility sequence 180 with respect to hardware threads HT1 and HT2 of a given SMT processor 120. As shown with respect to timelines 150A (representing operations at HT1) and 150B (representing operations at HT2), from time t0 to t1, the SEAM may ensure that address space AS 160A is accessible from both hardware threads HT1 and HT2. After an address space transition synchronization (ASTS) operation 171A, address space AS 160B may be accessible from both hardware threads until time t2. At or around time t2, a second ASTS 171B may be performed, and then both hardware threads HT1 and HT2 may have access to AS 160A again until time t3. At or around t3, another ASTS 171C may be implemented, and both hardware threads may again have access to AS 160B. Additional similar transitions may be performed further along timelines 150A and 150B with the help of SEAM components, to ensure that the sets of instructions scheduled and run concurrently at a given hardware thread have access to the same address space (and hence the same set of data objects) as those at other hardware threads of the same SMT processor 120. Note that while only two address spaces (AS 160A and AS160B) and only two hardware threads are shown by way of example in sequence 180, in at least some embodiments, address space transitions between more than two address spaces may be similarly synchronized, and more than two hardware threads may be involved.

According to some embodiments, the computing device 110 may be part of a fleet of resources of a network-accessible computing service, e.g., implemented at a provider network or cloud computing environment. In one such embodiment, a client of the computing service may submit a programmatic request indicating a trusted group of programs or processes (e.g., several different compute instances or guest virtual machines set up on behalf of the client). Instruction streams that belong to such a trusted group of processes or programs may be selected for co-execution at the same SMT processor in some embodiments, e.g., in preference to instruction streams that do not belong to the same trusted group.

Two-Way SMT Example

Figure 2:
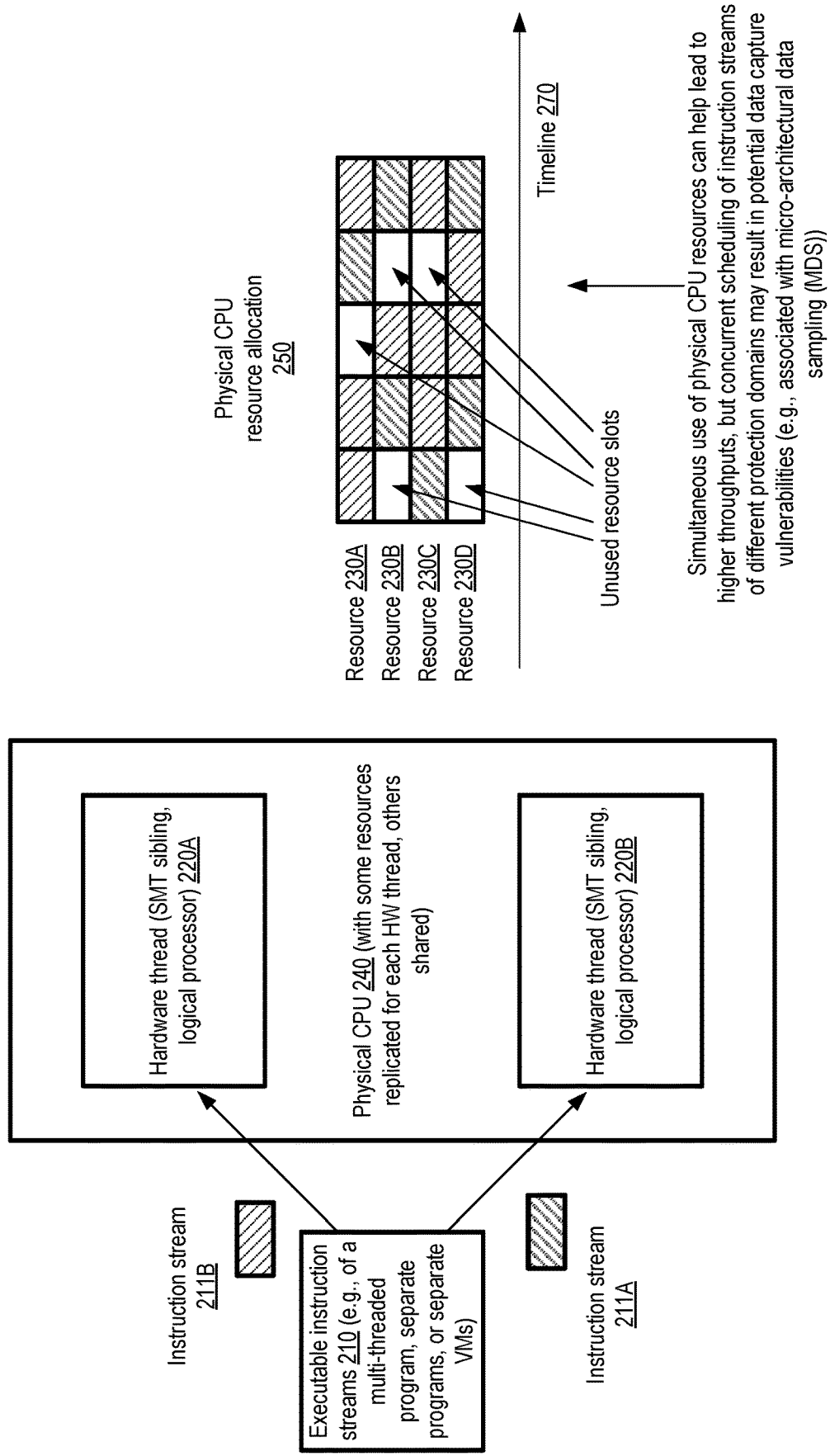
FIG. 2 illustrates an example of low-level physical resource allocation at a central processing unit (CPU) implementing two-way simultaneous multi-threading, according to at least some embodiments.

At processors which support simultaneous multi-threading (SMT), resources within a given processor may be assigned to respective instruction streams concurrently, thereby improving the overall throughput of the applications being executed using the instruction streams. FIG. 2 illustrates an example of physical low-level resource allocation at a central processing unit (CPU) implementing two-way simultaneous multi-threading, according to at least some embodiments. Physical CPU 240 may support two hardware threads 220A and 220B in the depicted embodiment, at which instruction streams such as 211A and 211B from a collection of executable instruction streams 210 may be scheduled. Individual instruction streams may, for example, represent portions of respective software processes or threads of a multi-threaded program, separate programs (e.g., members of a trusted group of programs identified for the CPU 240), and/or separate virtual machines in various embodiments. In some embodiments, the CPU 240 may be designed using an out-of-order superscalar processor by adding hardware support for multiple (e.g., two) software contexts, and the CPU may be presented to a software execution administration manager (such as an operating system or a hypervisor) as multiple logical CPUs. The hardware threads 220A and 220B may also be referred to as SMT siblings or logical processors.

Multiple context-supporting lower-level resources within the 2-hardware-thread SMT CPU 240 may be replicated (e.g., with one low-level resource implemented per hardware thread) or pooled together and shared in the depicted embodiment. For example, CPU resources that are replicated may include program counters, subroutine return stacks, instruction cache ports, instruction translation lookaside buffers (I-TLBs), architectural registers and register renaming components, instruction retirement components, and the like in some embodiments, while CPU resources that are pooled may include functional units, caches, and physical registers. In the instruction fetch stage of a pipeline implemented at an SMT CPU 240, instructions may be fetched for each of the hardware threads in at least some embodiments.

In FIG. 2, timeline 270 illustrates the allocation over time of various lower-level resources 230 of the CPU 240 among the two instruction streams 211A and 211B. For each of four example resources 230A, 230B, 230C and 230D, a number of consecutive slots are shown with respect to timeline 270, with the allotment of the resource (if the resource is allotted at all) being indicated by the shading of the slot. Thus, for example, in the first time slot shown at the left of the timeline 270, resource 230A is allocated to instruction stream 211B, resource 230C is allocated to instruction stream 211A, and resources 230B and 230D are unused. In contrast, in the second and fifth time slots shown, all four resources are allocated; three of the four resources are allocated in the third slot, and two are allocated in the fourth slot. As indicated in FIG. 2, such simultaneous or overlapping use of the physical CPU resources can help lead to higher application throughputs. However, concurrent scheduling of instruction streams that belong to different protection or security domains, if not done carefully, may result in potential data capture vulnerabilities (e.g., associated with micro-architectural data sampling (MDS) techniques and the like). Such vulnerabilities may be addressed in various embodiments using the address space co-execution techniques introduced above.

Example Data Accessed at Operating Systems on Behalf of User-Mode Programs

Figure 3:
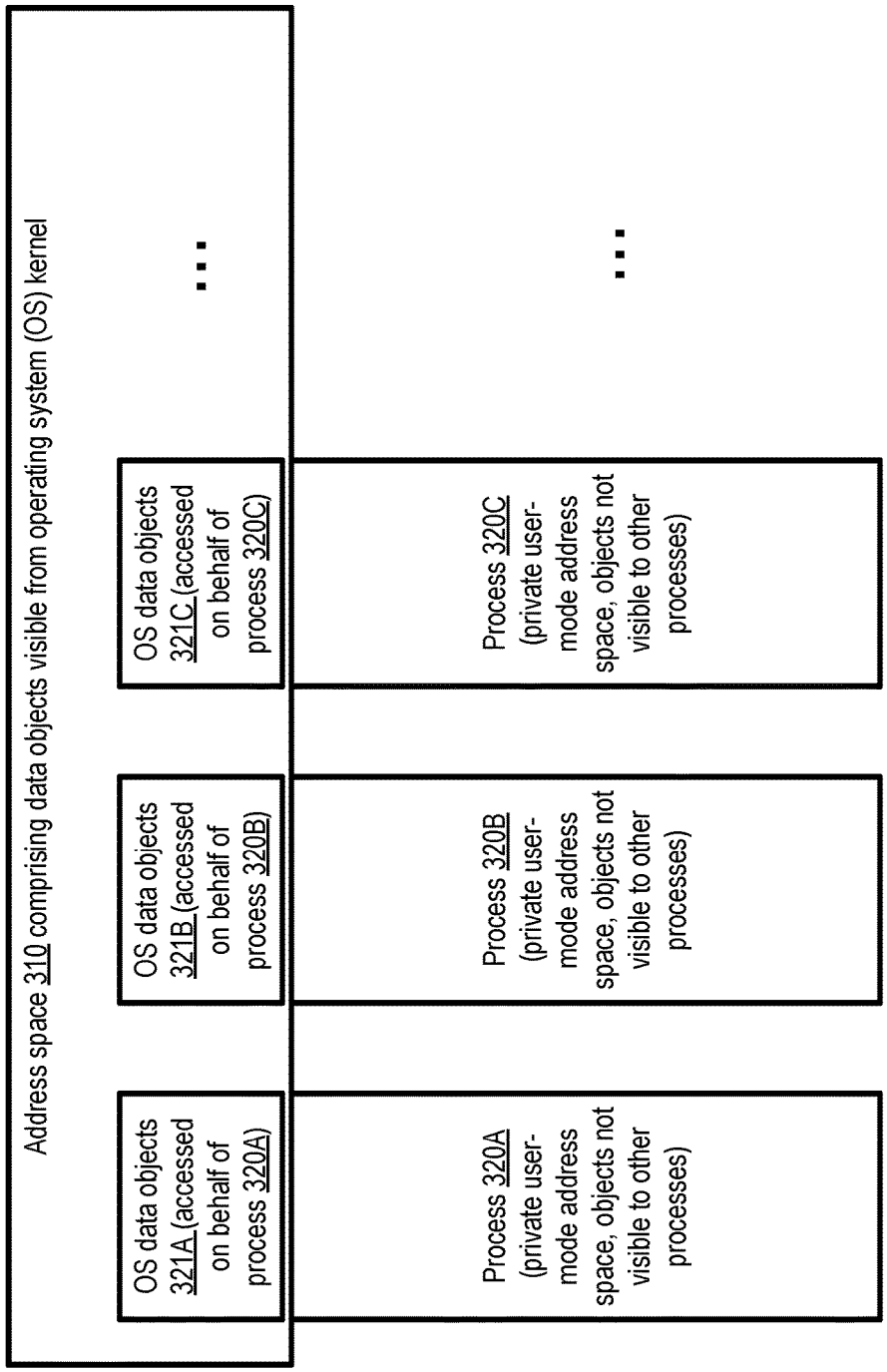
FIG. 3 illustrates examples of data objects that may be accessed by operating system components on behalf of various user-mode application processes, according to at least some embodiments.

In some embodiments, as mentioned earlier, data objects may be mapped from one address space (e.g., an operating system's address space) to another (e.g., an application process's address space) to reduce the frequency with which address space transitions synchronizations are needed while implementing address space co-execution. FIG. 3 illustrates examples of data objects that may be accessed by operating system components on behalf of various user-mode application processes, according to at least some embodiments. In the depicted embodiment, a number of application processes 320, such as 320A, 320B and 320C may be running at a non-virtualized computing device on top of a shared operating system. Individual ones of the processes 320 may have a respective private user-mode address space accessible, with the objects within that private address space (which require only user-mode privilege or permissions) not being accessible from the other processes.

At various points during the execution of a given process 320, a system call may be invoked, and instructions of the operating system may be executed on behalf of the process. During such periods of operating system execution, some set of operating system (OS) data objects 321 from within an address space 310 (for which kernel privileges are required) may be accessed on behalf of a process 320—e.g., OS data objects 321A may be accessed on behalf of process 320A, OS data objects 321B may be accessed on behalf of process 320B, and OS data objects 321C may be accessed on behalf of process 320C. In at least some embodiments, it may be possible for an SEAM component such as a memory manager to map some of the data objects 321 into the corresponding process's address space, without any negative side effects (e.g., a given OS data structure may not reveal any sensitive data that can be misused by the application code of the process). By implementing such mappings, the average number of instructions run without requiring address space transitions may be increased, thereby reducing the overhead associated with synchronizations of address space transitions in such embodiments.

Figure 4:
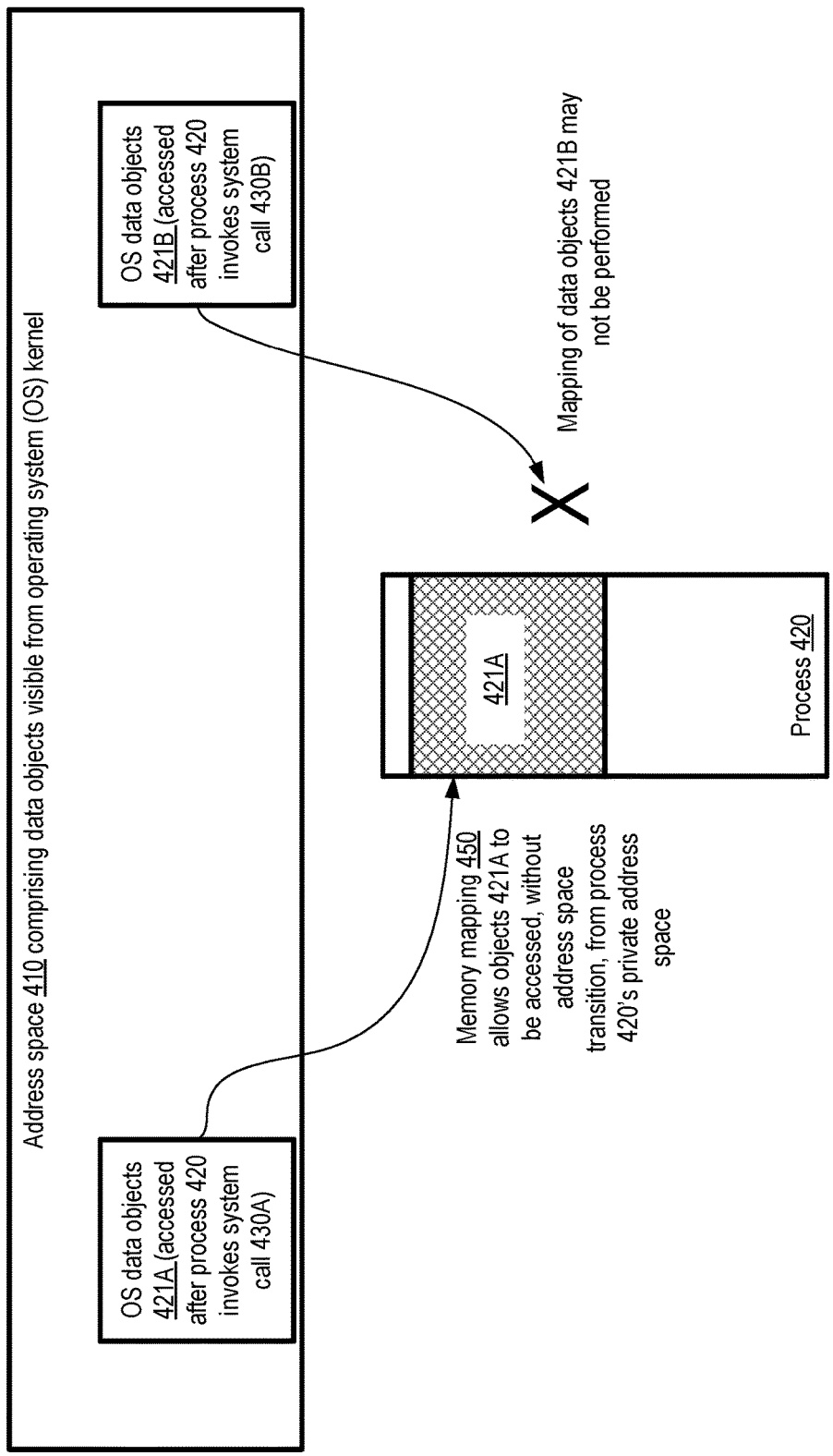
FIG. 4 illustrates an example memory mapping of data objects from an operating system address space into an address space of an application process, according to at least some embodiments.

FIG. 4 illustrates an example memory mapping of data objects from an operating system address space into an address space of an application process, according to at least some embodiments. Memory mapping 450 shows OS data objects 421A, from address space 410 of the OS kernel, being mapped to the private address space of process 420, allowing the data objects 421A to be accessed without requiring an address space transition. Data objects 421A may, for example, be accessed on behalf of process 420 after a system call 430A is invoked from process 420.

Note that there may be some OS data objects that cannot be mapped to application process address spaces, because they may contain information about other application processes which should not be made accessible to application code or for other reasons. For example, in the embodiment depicted in FIG. 4, OS data objects 421B, accessed after another system call 430B is invoked from process 420, may not be mapped into the address space of process 420. In at least some embodiments, as discussed below in the context of FIG. 5, the system calls offered by an operating system may be classified into those which access data objects which can be safely mapped (i.e., without negative side effects) into application process address spaces, and those system calls which access data that is not suitable for mapping to application process address spaces.

Example Classification of Operating System Data for Mapping to User Space

Figure 5:
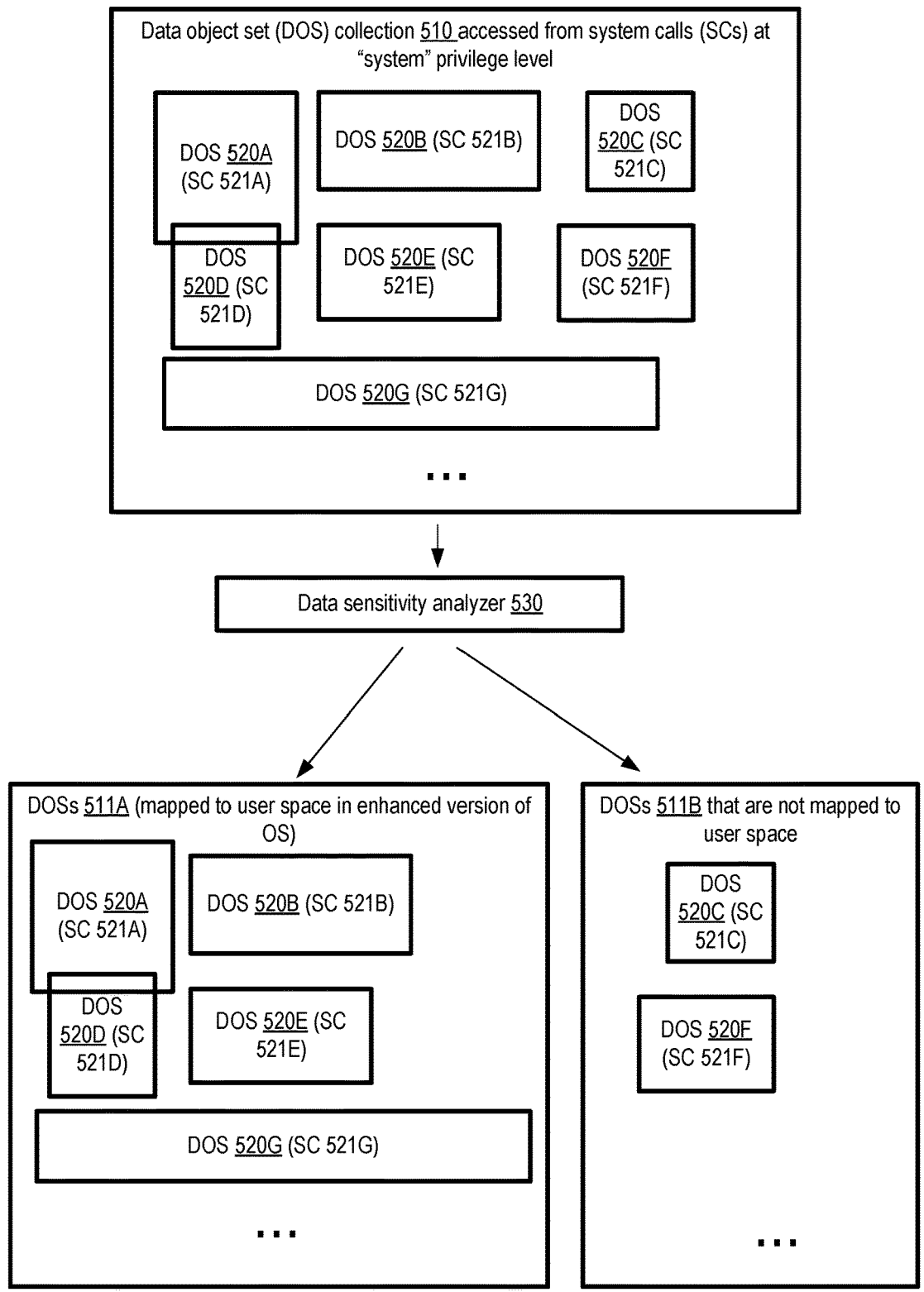
FIG. 5 illustrates an example classification of system calls based on whether data structures accessed by the system calls can be mapped into application program address spaces, according to at least some embodiments.

FIG. 5 illustrates an example classification of system calls based on whether data structures accessed by the system calls can be mapped into application program address spaces, according to at least some embodiments. A collection 510 of data structures and objects accessed from within an operating system, e.g., using an administrative or "system" privilege level, in response to respective system call invocations may be classified based on suitability for such mappings in the depicted embodiment. For example, data object set (DOS) 520A may be accessed when system call (SC) 521A is invoked, DOS 520B may be accessed when SC 521B is invoked, and so on. Note that some of the data object sets 520 may overlap with one another—e.g., one or more data structures accessed from one system call (such as 521D) may also be accessed from another system call (such as 521A).

A data sensitivity analyzer 530, implemented using software and/or hardware components of one or more computing devices, may be configured to examine the contents and usage of data objects sets 520 in the depicted embodiment, and place the DOSs into one of two categories—those which can be mapped to user space without security problems, and those which cannot. In an enhanced version of the operating system used for implementing address space co-execution in the depicted embodiment, DOSs 511A may comprise those data object sets that are suitable for mapping (e.g., when the corresponding system call is invoked), and DOSs 511B that are not mapped to user space. For example, DOSs 520A, 520B, 520D 520E and 520G may be categorized as suitable for mapping in the example scenario shown in FIG. 5, while DOSs 520C and 520F may not be considered suitable for mapping. In some embodiments, when an entry point of system call is reached, the category to which that system call's data object sets belong may be determined, and a respective mapping may be created dynamically for the data objects which have previously been designated in the suitable-for-mapping category. Note that in some embodiments, some data objects accessed during a given system call may be classified as suitable for mapping, while others may not. In at least one embodiment, after a given data object is mapped to user space from kernel space, it may remain mapped (and may therefore be used again without requiring address space transitions) for the lifetime of the process or thread to whose address space it was mapped.

Example Virtualization Host

Figure 6:
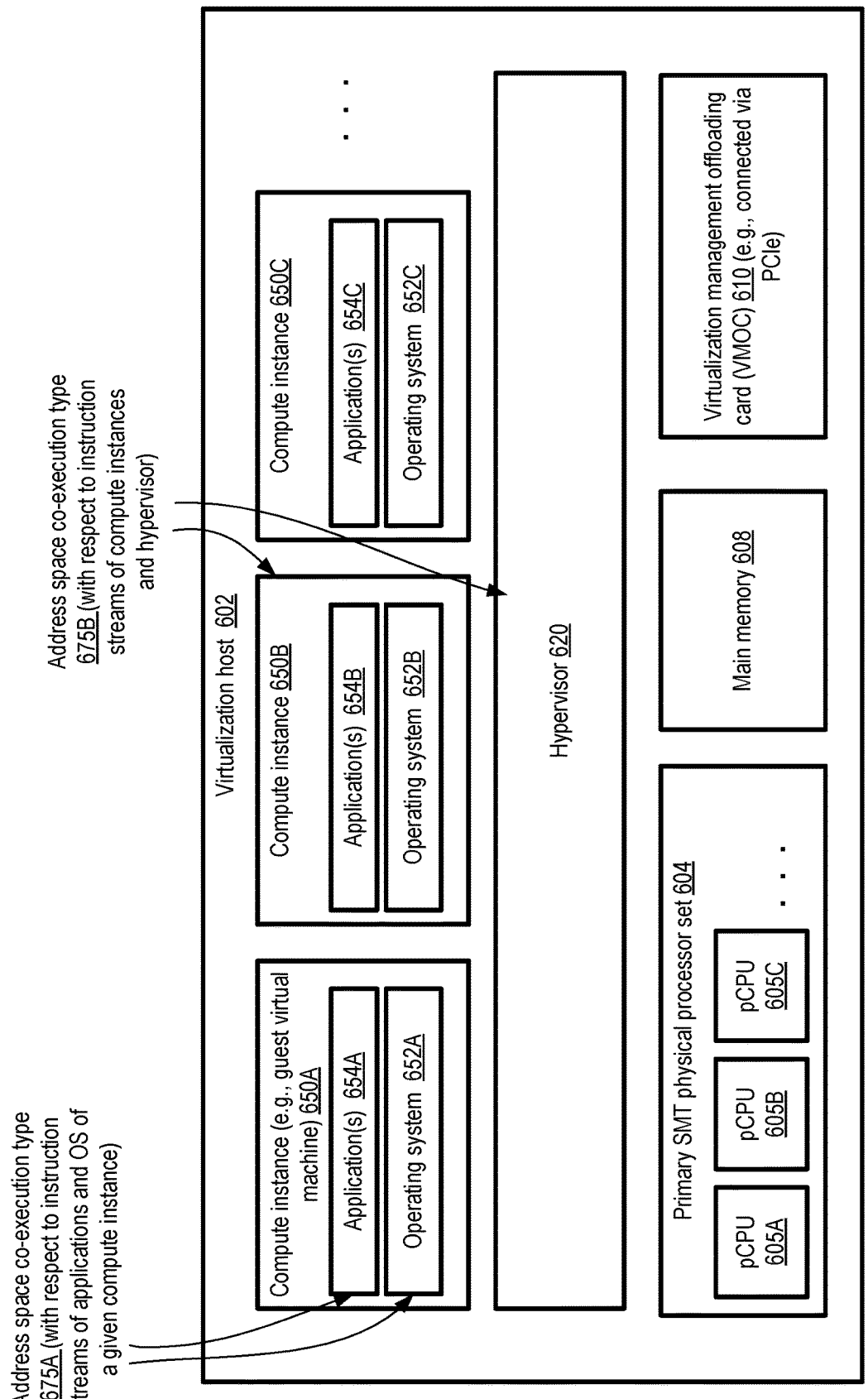
FIG. 6 illustrates example elements of a virtualization host at which one or more types of address space co-execution may be implemented, according to at least some embodiments.

In at least some embodiments, as indicated earlier, address space co-execution may be implemented at virtualization hosts. FIG. 6 illustrates example elements of a virtualization host at which one or more types of address space co-execution may be implemented, according to at least some embodiments. As shown, virtualization host 602 may comprise a primary SMT physical processor set 604, a main memory 608 and a virtualization management offloading card (VMOC) 610 in the depicted embodiment. Software components of the virtualization host 602 may include a hypervisor 620 and a set of compute instances, such as compute instances 650A, 650B and 650C, each of which comprise a respective operating system 652 (e.g., 652A, 652B or 652C) and one or more applications 654 (e.g., 654A, 654B or 654C). A given compute instance may, for example, comprise a respective guest virtual machine in the depicted embodiment. The hypervisor 620 (which may comprise software running on the primary SMT physical processor set) and the VMOC 610 may collectively be configured as intermediaries between the compute instances 650 and hardware components of the host, including the physical processors (pCPUs) 605A, 605B and 605C, as well as main memory 608 and networking hardware components such as one or more network interface cards (NICs) not shown in FIG. 6. As indicated by the use of the term "offloading" in the name, VMOC 610 may be responsible for offloading some of the workload associated with virtualization from the pCPUs, thus leaving more of the processing capacity of processor set 604 for the compute instances 650. In at least some embodiments, the VMOC may comprise, among other elements, one or more systems on chip (SOCs) that participate in virtualization coordination tasks (such as secure booting or initialization of the compute instances, processing of network packets to handle physical-address-to-virtual-address translation operations). In some embodiments, the VMOC may be linked to the pCPUs via a peripheral interconnect such as a Peripheral Component Interconnect—Express (PCIe) link.

In the depicted embodiment, address space transitions may be required, and address space co-execution may be performed, at several levels. For example, in address space co-execution type 675A, components of the respective operation systems 652 of the compute instances 650 may ensure, before a given instruction stream is scheduled for execution at a given hardware thread of a virtualized representation of a pCPU, that the address space to be accessed from that instruction stream is also accessible from any other hardware threads of the virtualized representation of the pCPU. This level of address space co-execution, 675A, may be performed with respect to transitions between application code and operating system code, for example.

In a second type of address space co-execution, 675B, the transitions may involve virtual machines and the hypervisor. As such, the execution of virtual machine instructions (with respect to co-execution type 675B) may be considered analogous to the execution of application instructions (with respect to co-execution type 675A), while the execution of hypervisor instructions (with respect to co-execution type 675B) may be considered analogous to the execution of operating system instructions (with respect to co-execution type 675A). In at least some embodiments, the hypervisor 620 may include components such as entry points, task schedulers, notification generators, notification handlers and memory mapping managers which collectively perform the operations needed to implement co-execution type 675B, while each of the operating systems 652 may similarly comprise its own set of components such as entry points, task schedulers, notification generators, notification handlers and memory mapping managers which collectively perform the operations needed to implement co-execution type 675A. Before allowing an instruction stream corresponding to a given compute instance to be executed on a given hardware thread of a pCPU 605, the hypervisor 620 may ensure that any instruction stream executing (or being scheduled for execution) at another hardware thread of that same pCPU 605 has access to the same address space. One potential example of a VMEXIT that could benefit from this approach is the CPUID instruction emulation. This may be executed in at least some embodiments in a very restricted address space without forcing hardware threads out of virtual machine mode (i.e., without requiring a transition to the hypervisor's address space). This is also true for several other instructions that require emulation, such as the equivalents of rdmsr (read from model specific register) and wrmsr (write to model specific register) instructions. Note that in some embodiments, address space co-execution at both levels 675A and 675B may be implemented at a virtualization host that does not include a VMOC.

In some embodiments, address space co-execution may be implemented at more than two levels in a virtualized computing environment. For example, a compute instance 650 may itself comprise a second-level hypervisor or virtualization manager, and one or more of the application(s) 654 may themselves comprise respective virtual machines. In such an environment, the task scheduler at each hypervisor or virtualization manager, regardless of its level in the virtualization hierarchy, may ensure that instruction streams executed concurrently at a given SMT processor's hardware threads all have access to the same address space.

Example Data Accessed at Hypervisors on Behalf of Compute Instances

Figure 7:
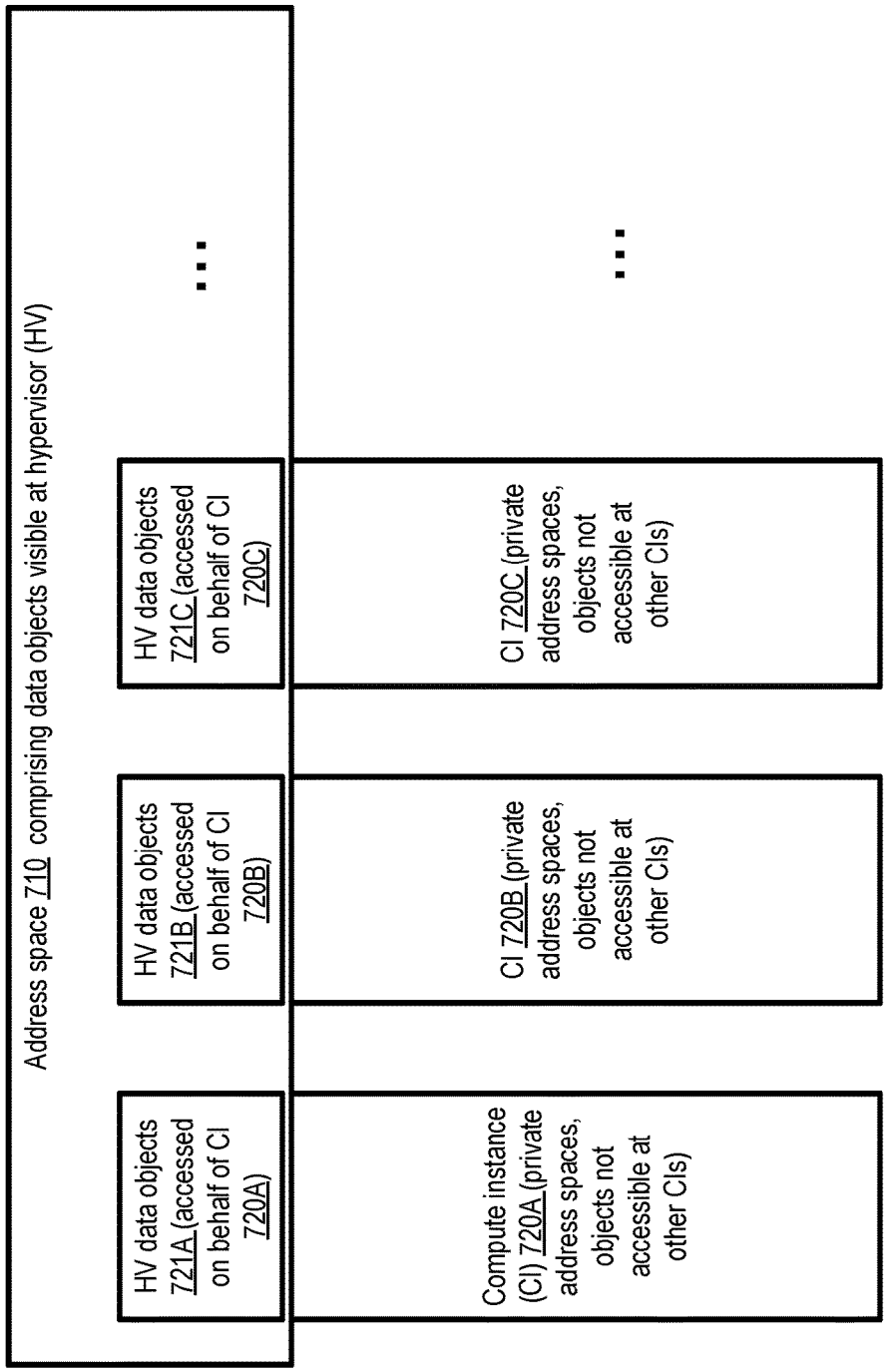
FIG. 7 illustrates examples of data objects that may be accessed by hypervisor components on behalf of various compute instances running at a virtualization host, according to at least some embodiments.

Just as data objects within an operating system's address space may be accessed on behalf of application processes, as discussed in the context of FIG. 3, data objects within a hypervisor's address space may be accessed on behalf of compute instances. FIG. 7 illustrates examples of data objects that may be accessed by hypervisor components on behalf of various compute instances running at a virtualization host, according to at least some embodiments. In the depicted embodiment, a number of compute instances 720, such as 720A, 720B and 720C may be running at virtualization host with the help of a hypervisor and/or other virtualization management components such as a virtualization management offloading card. Individual ones of the compute instances 720, each of which may for example comprise a guest virtual machine, may have a respective collection of private address spaces (which may include an operating system's address space as well as one or more application address spaces), with the objects within those private address spaces not being accessible from the other compute instances.

At various points during the execution of a given compute instance 720, a virtualization management related operation may have to be performed by the hypervisor, and instructions of the hypervisor may be executed on behalf of the compute instance. Such phases of hypervisor activity may be triggered, for example, by VMEXITs caused by hypercalls, exceptions, interrupts or the like. During such periods of hypervisor code execution, some set of hypervisor (HV) data objects 721 from within an address space 710 (normally inaccessible from outside the hypervisor) may be accessed on behalf of a compute instance 720—e.g., HV data objects 721A may be accessed on behalf of CI 720A, HV data objects 721B may be accessed on behalf of CI 720B, and HV data objects 721C may be accessed on behalf of process 720C. In at least some embodiments, it may be possible for an SEAM component such as a memory manager of the hypervisor to map some of the data objects 721 into the corresponding CI's address space, without any negative side effects (e.g., a given HV data structure may not reveal any sensitive data that can be misused by the code of the CI). By implementing such mappings, the average number of instructions run without requiring address space transitions between hypervisors and compute instances may be increased, thereby reducing the overhead associated with synchronizations of address space transitions in such embodiments.

Figure 8:
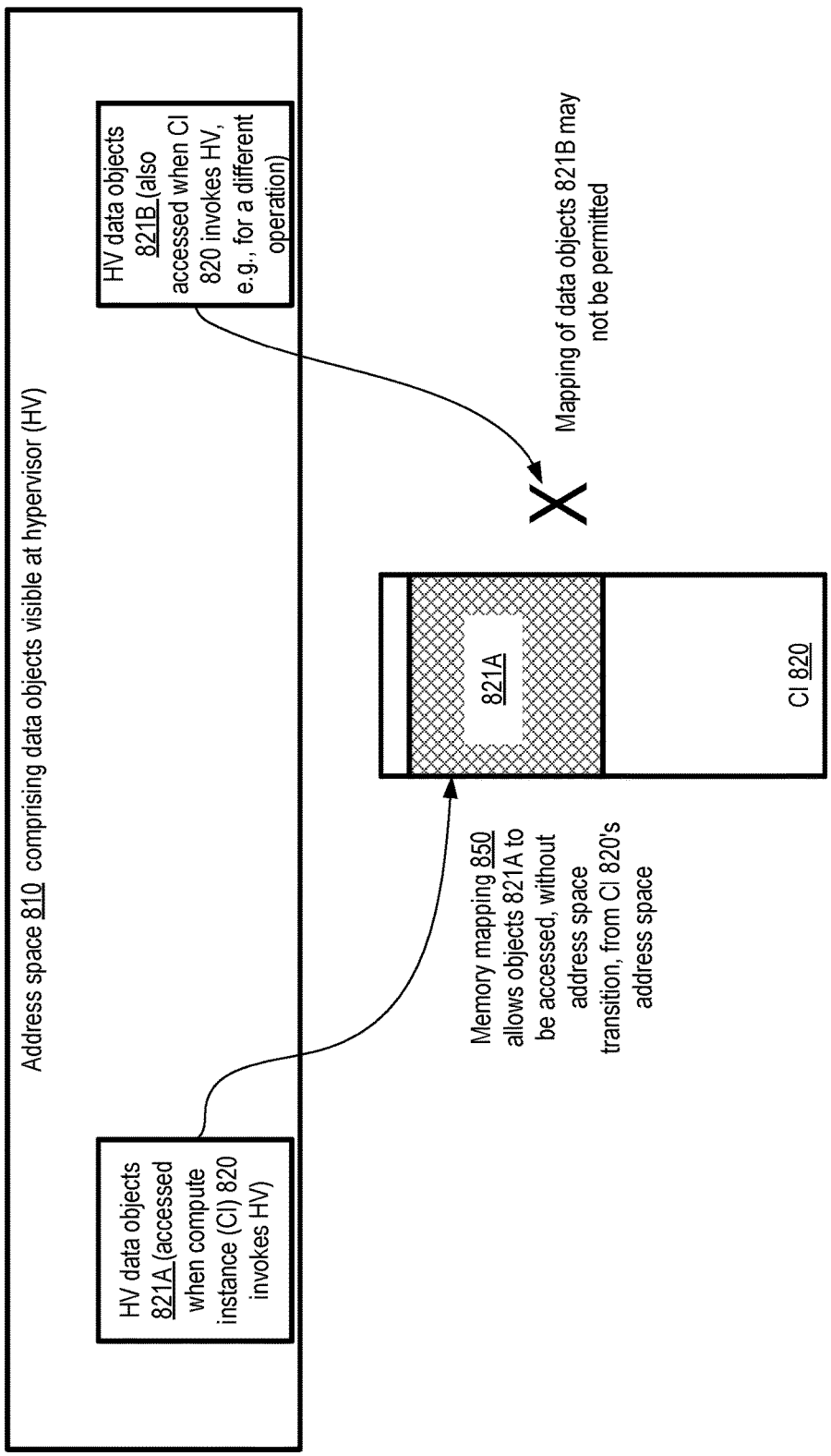
FIG. 8 illustrates an example memory mapping of data objects from a hypervisor's address space into an address space of a compute instance, according to at least some embodiments.

FIG. 8 illustrates an example memory mapping of data objects from a hypervisor's address space into an address space of a compute instance, according to at least some embodiments. Memory mapping 850 shows HV data objects 821A, from address space 810 of the hypervisor, being mapped to an address space of compute instance 820, allowing the data objects 821A to be accessed without requiring an address space transition. Data objects 821A may, for example, be accessed on behalf of compute instance 820 after the hypervisor is invoked from CI 820.

Note that there may be some HV data objects that cannot be mapped to CI address spaces, because they may contain information about other CIs which should not be made accessible to CI code. For example, in the embodiment depicted in FIG. 8, HV data objects 821B, accessed after another call to the hypervisor on behalf of CI 820, may not be mapped into the address space of CI 820. In at least some embodiments, as discussed below in the context of FIG. 9, the virtualization management operations performed by a hypervisor may be classified into those which access data objects which can be safely mapped (i.e., without negative side effects) into CI address spaces, and those which access data that is not suitable for mapping to CI address spaces.

Figure 9:
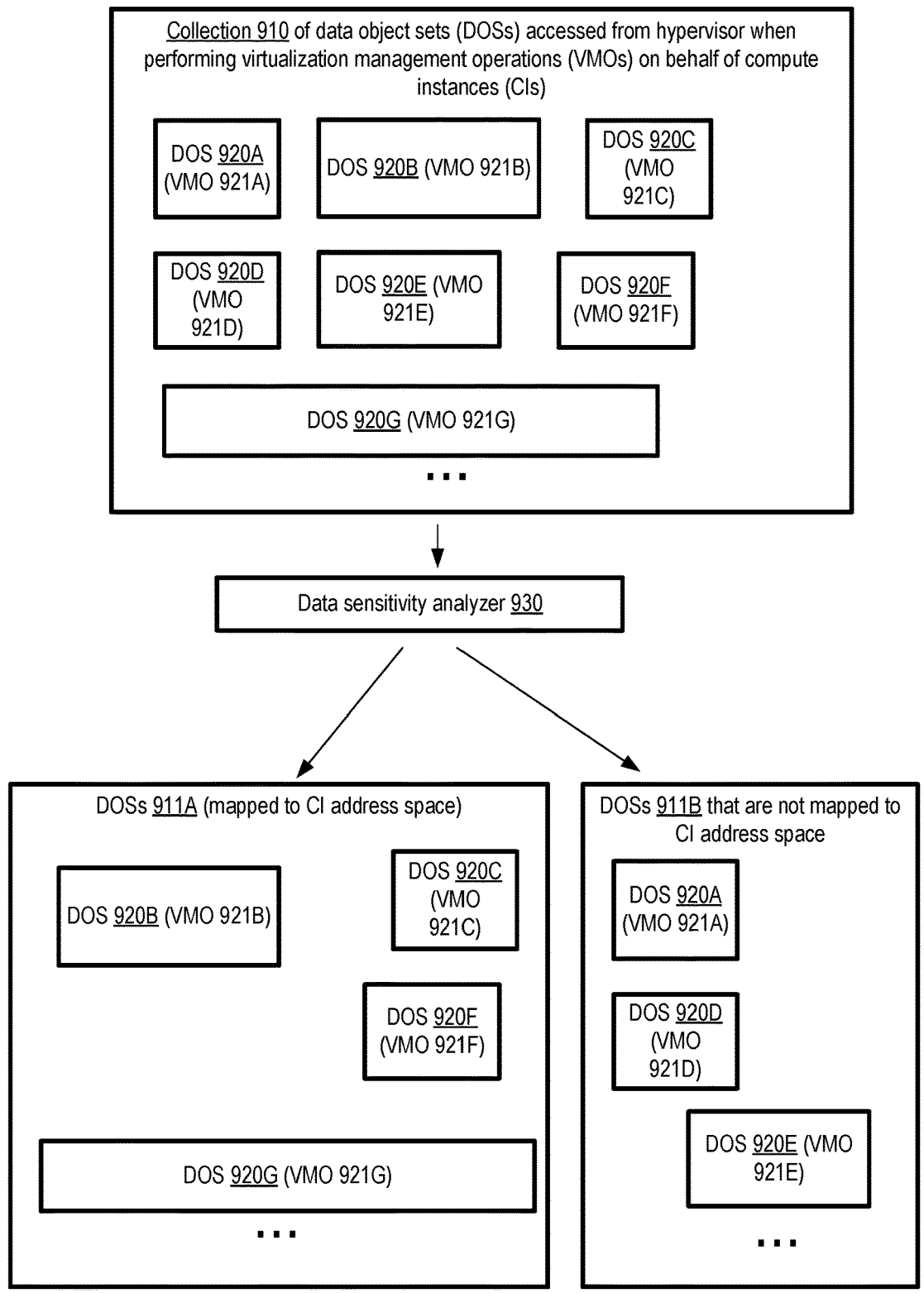
FIG. 9 illustrates an example classification of hypervisor data objects based on whether the objects can be mapped into compute instance address spaces, according to at least some embodiments.

Example Classification of Hypervisor Data for Mapping to Compute Instance Address Spaces FIG. 9 illustrates an example classification of hypervisor data objects based on whether the objects can be mapped into compute instance address spaces, according to at least some embodiments. A collection 910 of data structures and objects accessed from within hypervisor (e.g., using a virtualization manager privilege level), when performing various virtualization management operations (VMOs) (such as operations performed to implement input/output operations, memory management operations and the like) may be classified based on suitability for such mappings in the depicted embodiment. For example, data object set (DOS) 920A may be accessed when VMO 921A is performed, DOS 920B may be accessed when VMO 921B is invoked, and so on. Note that some of the data object sets 920 may overlap with one another in some embodiments—e.g., one or more data structures accessed during one VMO may also be accessed during another VMO.

A data sensitivity analyzer 930, implemented using software and/or hardware components of one or more computing devices, may be configured to examine the contents and usage of data objects sets 920 in the depicted embodiment, and place the DOSs into one of two categories—those which can be mapped to compute instance space without security or other problems, and those which cannot. In an enhanced version of the hypervisor used for implementing address space co-execution in the depicted embodiment, DOSs 911A may comprise those data object sets that are suitable for mapping (e.g., when the VMO is performed), and DOSs 911B that are not mapped to user space. For example, DOSs 920B, 920C, 920F and 920G may be categorized as suitable for mapping in the example scenario shown in FIG. 9, while DOSs 920A, 920D and 920E may not be considered suitable for mapping. In some embodiments, when an entry point of a VMO is reached, the category to which that VMO's data object sets belong may be determined, and a respective mapping may be created for the data objects which have previously been designated in the suitable-for-mapping category. Note that in some embodiments, some data objects accessed during a given VMO may be classified as suitable for mapping, while others may not. In at least one embodiment, after a given data object is mapped to compute instance space from hypervisor space, it may remain mapped (and may therefore be used again without requiring address space transitions) for the lifetime of the compute instance to whose address space it was mapped.

Methods for Implementing Address Space Co-Execution

Figure 10:
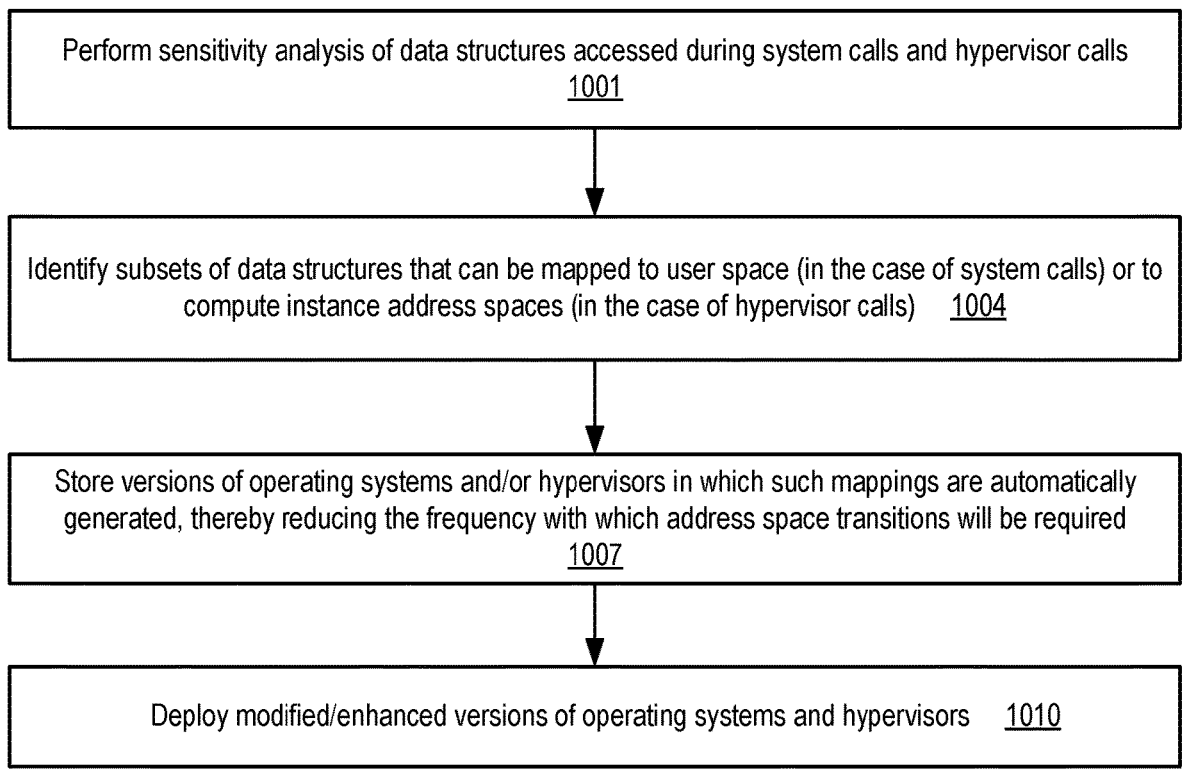
FIG. 10 is a flow diagram illustrating aspects of operations that may be performed to reduce the frequency at which address space transitions may be required at processors implementing simultaneous multi-threading, according to at least some embodiments.

FIG. 10 is a flow diagram illustrating aspects of operations that may be performed to reduce the frequency at which address space transitions may be required at processors implementing simultaneous multi-threading, according to at least some embodiments. As shown in element 1001, sensitivity analysis of data structures and other objects accessed during system calls and/or hypervisor calls may be performed, e.g., to identify the extent to which the data structures/objects contain private information that should not be shared across application processes or compute instances.

Subsets of the analyzed set of data structures or objects that can be mapped safely to user/application address spaces (in the case of system calls) or to compute instance address spaces (in the case of hypervisor calls) may be identified (element 1004) based on the results of the sensitivity analysis. Versions of operating systems or hypervisors in which such mappings are automatically and dynamically generated, e.g., at an entry point of the operating system or the hypervisor may be created and stored (element 1007). Such versions may reduce the frequency with which address space transitions are required, and may therefore require less overhead for address space transition synchronizations. The modified/enhanced versions of the operating systems and/or hypervisors may be deployed to computing devices with SMT processors, at which address space co-execution techniques of the kind described above may be implemented (element 1010).

Figure 11:
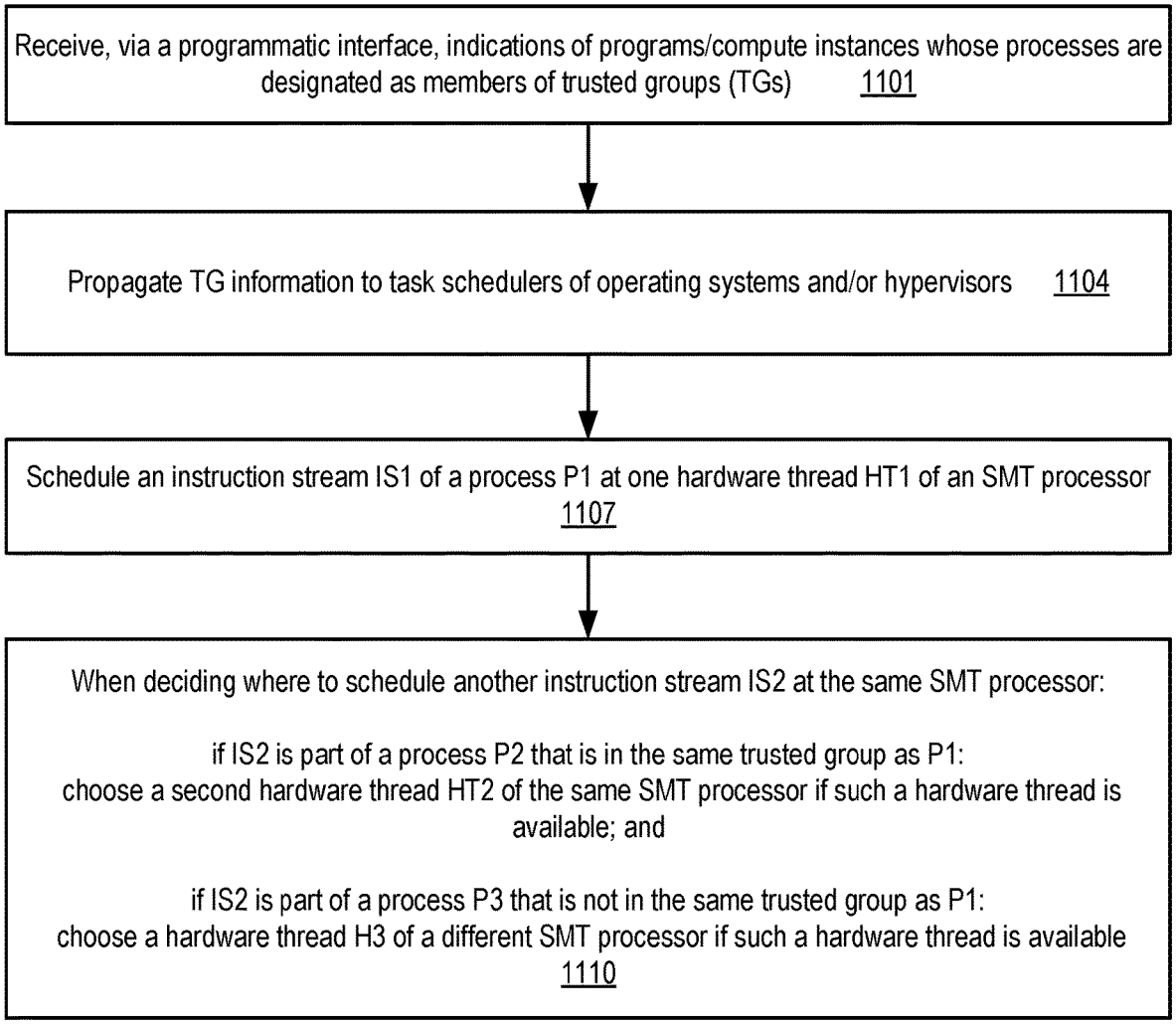
FIG. 11 is a flow diagram illustrating aspects of operations that may be performed to make schedule instruction streams based on designations of trusted instruction streams, according to at least some embodiments.

FIG. 11 is a flow diagram illustrating aspects of operations that may be performed to make schedule instruction streams based on designations of trusted instruction streams, according to at least some embodiments. Indications of programs or compute instances whose processes are designated as members of a trusted group may be received, e.g., via one or more programmatic interfaces of a computing service at which address space co-execution is to be implemented. Such programmatic interfaces may include, for example, a web-based console, a set of application programming interfaces (APIs), command-line tools, graphical user interfaces, or the like in different embodiments. The designation of two programs Prog1 and Prog2 as members of a trusted group may be interpreted as a hint that it is safe to execute instruction streams corresponding to processes of Prog1 or Prog2 at respective hardware threads of a given SMT processor.

The trusted group information obtained via the programmatic interfaces may be propagated to task schedulers at operating systems and/or hypervisors at a fleet of computing devices equipped with SMT processors (element 1104). A task scheduler may schedule an instruction stream IS1 of a process P1 at one hardware thread of an SMT processor (element 1107), e.g., as part of normal operations at a hypervisor or operating system.

When deciding where to schedule another instruction stream IS2, the following logic may be used by the task scheduler in at least some embodiments, as shown in element 1110. If IS2 is part of a process P2 which is in the same trusted group as P1, a hardware thread HT2 of the same SMT processor may preferably be chosen to execute IS2, if such a hardware thread is available. In contrast, if IS2 is part of a process P3 which is not in the same trusted group as P1, a hardware thread HT2 of a different SMT processor may preferably be chosen to execute IS2, if such a hardware thread is available. Note that such trusted-group based scheduling may be considered an optimization rather than a strictly-enforced requirement in some embodiments, since task schedulers may not necessarily always have information available about trusted groups with respect to the currently executing instruction streams, and because hardware threads that can be used to schedule a trusted stream may not always be available.

FIG. 12 is a flow diagram illustrating aspects of operations that may be performed to enforce address space co-execution at a processor implementing simultaneous multi-threading, according to at least some embodiments. In the depicted embodiment, a mapping of a data object DO1, access to which requires a privilege level PL1 (e.g., kernel or system privilege, or hypervisor privilege), may be generated from one address space AS1 to another address space AS2 (element 1201) at an SMT processor that comprise at least two hardware threads HT1 and HT2. The SMT processor may be incorporated within a computing device similar to device 110 of FIG. 1, i.e., a device which comprises the types of software execution administration manager components configure to implement address space co-execution of the kind introduced in the context of FIG. 1. AS1 may, for example, comprise an address space of an operating system kernel or a hypervisor, while AS2 may comprise an address space of an application or user-mode process or a compute instance. AS2 may comprise one or more data objects which require a different privilege level PL2.

A first stream of instructions (IS1), e.g., implementing a portion of a process P1 which has access to AS2 may be executed at HT1 of the SMT processor (element 1204), e.g., based on a decision made by a task scheduler of an operating system or hypervisor. A determination may be made, e.g., at an operating system entry point or a hypervisor entry point, that a second stream of instructions IS2, which requires access to an object DO2 within a different address space than the one currently accessible from HT1, is to be run at HT1 (element 1207). For example, IS2 may require access to address space AS1, and D02 may not be mapped to AS2.

In various embodiments, an indication may be obtained, before scheduling any of the instructions of IS2 at HT1, that the different address space has been made accessible from other hardware threads (e.g., from hardware thread HT2) of the processor (element 1210). A number of different approaches may be taken towards ensuring this types of synchronization with respect to address spaces in different embodiments. For example, as discussed below in the context of FIG. 13, in some cases a respective request, notification or interrupt may be sent from HT1 to each of the other hardware threads, and an address space transition may be performed at each of the other hardware threads in response to such a message. In other embodiments, a more passive approach may be taken, in which a task scheduler may simply wait, without sending a notification, request or interrupt, until an indication is received from each of the other hardware threads that the different address space has been made accessible (e.g., that a respective instruction stream with access to the different address space has been scheduled at each of the other hardware threads). After it is confirmed that the different address space is accessible from all the other hardware threads of the processor, the instructions of IS2 may be executed at HT1 in the embodiment depicted in FIG. 12.

Figure 13:
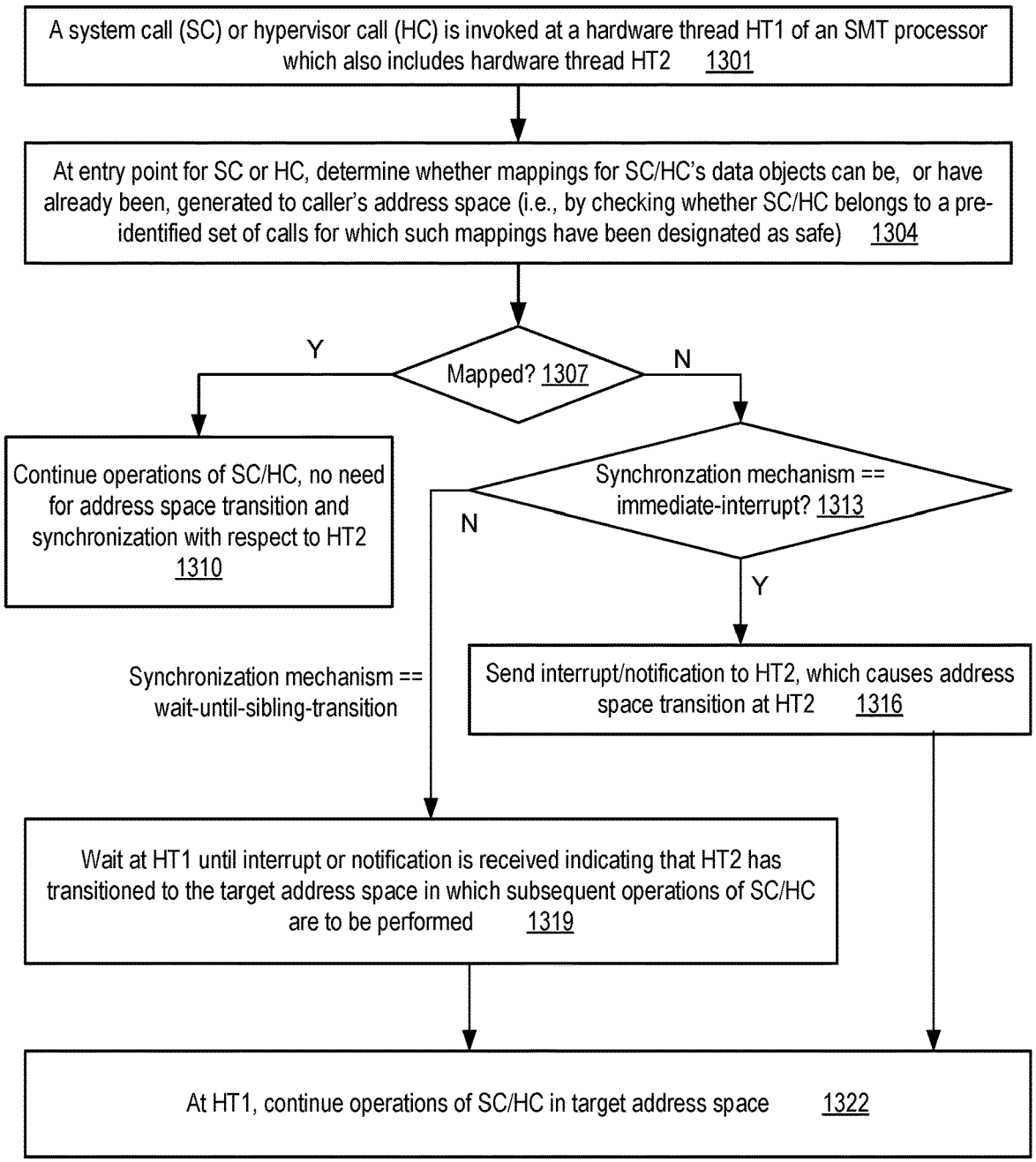
FIG. 13 is a flow diagram illustrating aspects of operations that may be performed to enforce address space co-execution in an environment in which memory mapping is used to reduce requirements for address space transitions, according to at least some embodiments.

FIG. 13 is a flow diagram illustrating aspects of operations that may be performed to enforce address space co-execution in an environment in which memory mapping is used to reduce requirements for address space transitions, according to at least some embodiments. A system call (SC) or hypervisor call (HC) may be invoked at a hardware thread HT1 of an SMT processor which also includes a second hardware thread HT2 (element 1301), e.g., on behalf of a caller such as an application process or a compute instance process.

The SC or HC may result in the execution of a portion of code called an entry point (e.g., a common portion of an operating system or hypervisor, executed whenever any system call or hypervisor call is invoked, which in turn is responsible for passing control to the call-specific code). At the entry point for the SC or HC, a determination may be made whether mappings for one or more data objects to be accessed by the SC/HC to the caller's address space can be (or already have been) generated in the depicted embodiment (element 1304). As discussed earlier, in some embodiments, this type of checking may simply involve determining whether the specific SC/HC that was invoked belongs to a pre-determined list of SCs/HCs for which such mappings have been designated as permissible. In at least some embodiments, the mappings may be generated dynamically after the entry point is reached during the course of the execution of the instruction stream. In one embodiment, once a data object that was allocated in a kernel address space (or a hypervisor address space) has been mapped, the mapping may remain in effect for the lifetime of the caller.

If the data objects of the SC/HC are mapped to the caller's address space (as detected in operations corresponding to element 1307), there would be no need for an address space transition and synchronization with respect to HT2, and the operations of the SC/HC may be continued in the depicted embodiment (element 1310). If at least some of the data objects are not mapped, as also determined in operations corresponding to element 1307, a synchronization may be required for an address space transition from the current address space accessible at HT1 to a target address space.

One of at least two types of synchronization mechanisms may be employed in different embodiments; the particular mechanism to be used by may be governed by a configuration parameter in at least some embodiments. If a mechanism called "immediate-interrupt" is to be used, as determined in element 1313, an interrupt or notification may be sent to HT2, which causes an address space transition at HT2, such that the SC/HC address space becomes accessible to instruction streams that are to run at HT2 in the depicted embodiment (element 1316). The interrupt sent to HT2, and handled at HT2, may indicate that a stream of instructions that requires access to the target address space of the transition is to be scheduled at HT1, in at least some implementations. The operations of the SC/HC may proceed at HT1 after the transition is forced at HT2 as a result of the interrupt/notification (element 1321).

In contrast, if a synchronization mechanism called wait-until-sibling-transition is to be used, a waiting period may be initiated at HT1, and may last until an interrupt or notification is received from HT2, indicating that HT2 has transitioned to the target address space in which the subsequent operations of the SC/HC are to be performed (element 1319). In at least some embodiments, such a notification may indicate that another stream of instructions which accesses the target address space has been scheduled at HT2, and the notification may be received without an explicit request (from HT1) that access to the target address space be granted at HT2. After such a notification or interrupt is received, the operations of the SC/HC may continue at HT1 (element 1321). Note that at least in some embodiments, the wait phase corresponding to element 1319 may comprise a spin-wait or busy-wait, in which the received status of HT2 is checked repeatedly at HT1.

It is noted that in various embodiments, some of the operations shown in FIG. FIG. 10, FIG. 11, FIG. 12 and/or FIG. 13 may be implemented in a different order than that shown in the figure, or may be performed in parallel rather than sequentially. Additionally, some of the operations shown in FIG. 10, FIG. 11, FIG. 12 and/or FIG. 13 may not be required in one or more implementations.

Use Cases

The techniques described above, of ensuring that each of the instruction streams that is scheduled at respective hardware threads of an SMT processor has access to the same address space as is accessible at the other hardware threads, may be extremely useful in enhancing application security in various environments. Many servers employed as multi-tenant virtualization hosts at computing services implemented at provider network or cloud computing environments may, for example, be used concurrently to run applications on behalf of numerous clients. If such virtualization hosts comprise modern SMT processors at which the kinds of security vulnerabilities discovered recently (such as the MDS vulnerability) are present, and the vulnerabilities are not mitigated, this may expose application data to potential unauthorized capture via side channels. By using address space co-execution, as well as mappings of data objects safely across address spaces, the chances of such data capture may be eliminated entirely in software, with relatively low performance overhead.

Illustrative Computer System

Figure 14:
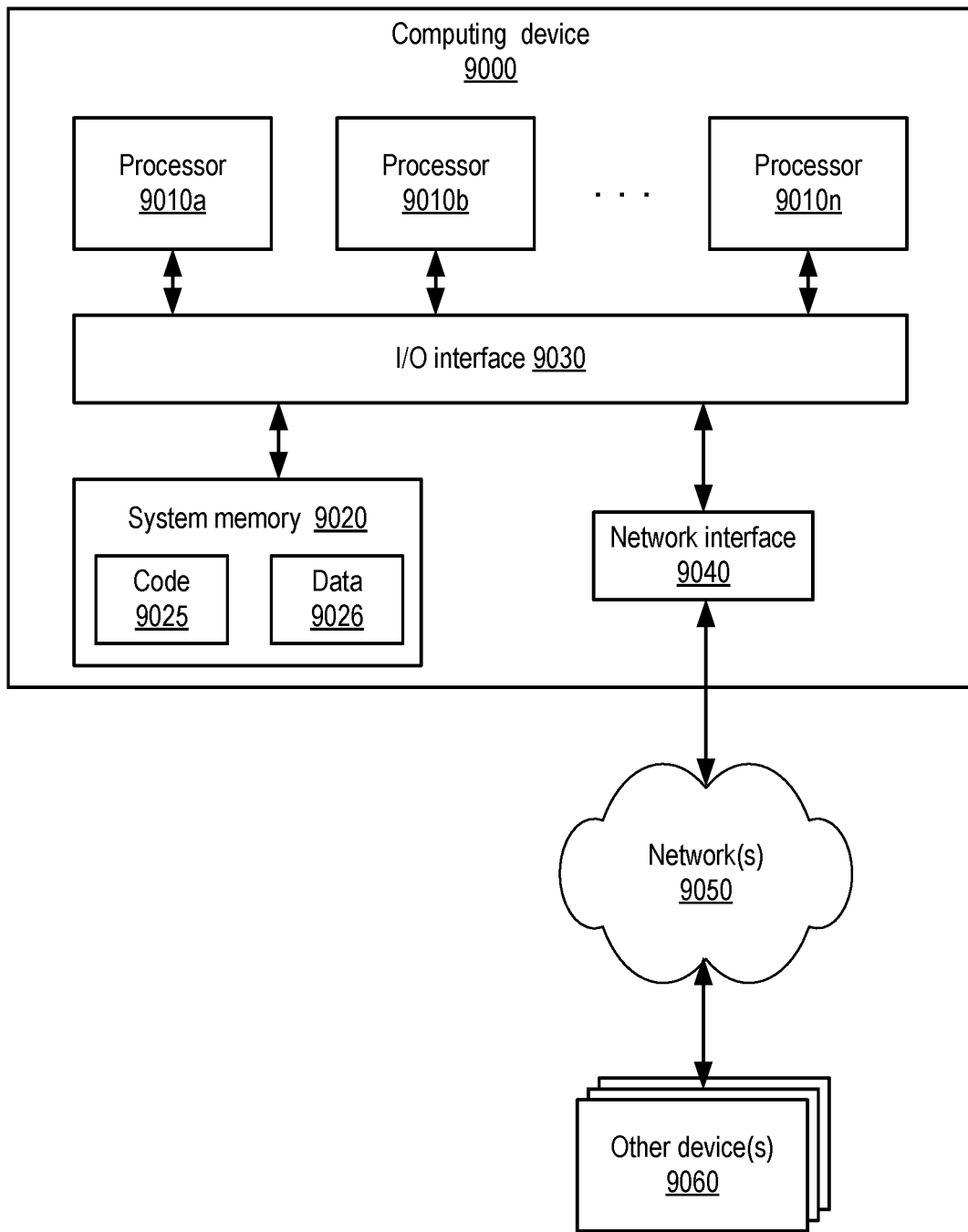
FIG. 14 is a block diagram illustrating an example computing device that may be used in at least some embodiments.

In at least some embodiments, a server that implements a portion or all of one or more of the technologies described herein, including the techniques for address space co-execution via various components of an operating system or hypervisor, may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a computing device including a memory and a processor, wherein the processor supports simultaneous multi-threading, and wherein a plurality of hardware threads of the processor include a first hardware thread and a second hardware thread;
wherein the memory includes instructions that upon execution on the processor cause the computing device to:
cause a first stream of instructions to be executed at the first hardware thread, wherein the first stream is provided access to a plurality of data objects within a second address space of the computing device;
determine that a second stream of instructions different than the first stream of instructions, which accesses a first address space of the computing device different than the second address space, is to be executed at the first hardware thread;
obtain an indication, prior to causing an instruction of the second stream to be executed at the first hardware thread, that the same first address space which the second stream of instructions accesses is also accessible from the second hardware thread distinct from the first hardware thread; and
based at least in part on the obtained indication that the same first address space which the second stream of instructions accesses is also accessible from the second hardware thread, execute the second stream of instructions at the first hardware thread;
wherein the second stream of instructions is not allowed to execute at the first hardware thread until the same first address space, which the second stream of instructions accesses, is also accessible from the second hardware thread by a third stream of instructions, different than the first and second streams of instructions, executing on the second hardware thread.

2. The system as recited in claim 1, wherein the first stream is caused to be executed at the first hardware thread by a task scheduler of an operating system executing on the computing device.

3. The system as recited in claim 1, wherein the first stream is caused to be executed at the first hardware thread by a task scheduler of a hypervisor executing on the computing device.

4. The system as recited in claim 1, wherein the indication that the first address space is accessible from the second hardware thread comprises a notification that the third stream of instructions which accesses the first address space has been scheduled at the second hardware thread, wherein the notification is received without requesting that access to the first address space be granted at the second hardware thread.

5. The system as recited in claim 1, wherein the memory includes further instructions that upon execution on the processor further cause the computing device to:
generate an interrupt indicating that the second stream of instructions is to be scheduled at the first hardware thread, wherein the interrupt is handled at the second hardware thread.

6. A method, comprising:
performing, at a computing device:
scheduling execution of a first set of instructions at a first hardware thread of a plurality of hardware threads of a first processor of the computing device, wherein the first set of instructions has access to one or more objects within a first address space of the computing device;
verifying, prior to executing an instruction of a second set of instructions different than the first set of instructions at the first hardware thread, wherein the second set of instructions accesses an object within a second address space of the computing device different than the first address space, that the same second address space is also accessible from a second hardware thread of the plurality of hardware threads distinct from the first hardware thread; and
based at least in part on the verification that the same second address space which the second set of instructions accesses is also accessible from the second hardware thread, executing the second set of instructions at the first hardware thread;
wherein the second set of instructions is not allowed to execute at the first hardware thread until the same second address space, which the second stream of instructions accesses, is also accessible from the second hardware thread by a third set of instructions, different than the first and second sets of instructions, executing on the second hardware thread.

7. The method as recited in claim 6, wherein the one or more objects comprise a first object and a second object, wherein access to the first object requires a first privilege level, and wherein access to the second object requires a second privilege level.

8. The method as recited in claim 6, further comprising performing, at the computing device:
obtaining, via one or more programmatic interfaces, an indication of a trusted group of processes including a first process and a second process, wherein the first set of instructions implements an operation of the first process;
identifying, for execution at the second hardware thread, the third set of instructions, wherein the third set of instructions implements an operation of the second process; and
determining that a fourth set of instructions, which implement an operation of a process which is not a member of the trusted group, is to be scheduled at a second processor of the computing device.

9. The method as recited in claim 6, wherein the scheduling is performed by a task scheduler of an operating system executing on the computing device.

10. The method as recited in claim 6, wherein the first set of instructions implement an operation of a virtual machine executing on the computing device, and wherein the second set of instructions implement an operation of a hypervisor executing on the computing device.

11. The method as recited in claim 6, further comprising performing, at the computing device:
receiving, without requesting that access to the second address space be granted at the second hardware thread, a notification that the third set of instructions which accesses the second address space has been scheduled at the second hardware thread, wherein the notification indicates that the second address space is accessible from the second hardware thread.

12. The method as recited in claim 6, further comprising performing, at the computing device:
generating an interrupt indicating that the second set of instructions is to be scheduled at the first hardware thread, wherein the interrupt is handled at the second hardware thread.

13. The method as recited in claim 6, wherein the first address space comprises an address space of an application executing at an operating system executing on the computing device, wherein a first object of the one or more objects of the address space comprises an object allocated by a user-mode component of the application, and wherein a second object of the one or more objects of the first address space comprises an object that is (a) allocated by a kernel of the operating system and (b) mapped into the address space of the application.

14. The method as recited in claim 6, wherein the first address space comprises an address space of a virtual machine executing on the computing device, wherein a first object of the one or more objects of the address space comprises an object allocated by a component of the virtual machine, and wherein a second object of the one or more objects of the first address space comprises an object that is (a) allocated by a hypervisor executing on the computing device and (b) mapped into the address space of the virtual machine.

15. The method as recited in claim 6, further comprising performing at the computing device:
determining, at a system call entry point of an operating system executing on the computing device, based at least in part on detecting that a first system call has been invoked, that the second set of instructions accesses an object within the second address space, wherein the second set of instructions implements an operation of the first system call; and
determining, at the system call entry point, based at least in part on detecting that a second system call has been invoked, that a fourth set of instructions which implements an operation of the second system call does not require an address space transition.

16. One or more non-transitory computer-accessible storage media storing program instructions that when executed on or across one or more processors cause one or more computer systems to:
schedule execution of a first set of instructions at a first hardware thread of a plurality of hardware threads of a first processor of the one or more processors, wherein the first set of instructions is provided access to one or more objects within a first address space of the first processor;
determine, prior to executing an instruction of a second set of instructions different than the first set of instructions at the first hardware thread, wherein the second set of instructions accesses an object within a second address space different than the first address space, that the same second address space of the first processor is also accessible from a second hardware thread of the plurality of hardware threads distinct from the first hardware thread; and
based at least in part on the determination that the same second address space which the second set of instructions accesses is also accessible from the second hardware thread, execute the second set of instructions at the first hardware thread;
wherein the second set of instructions is not allowed to execute at the first hardware thread until the same second address space, which the second set of instructions accesses, is also accessible from the second hardware thread by a third set of instructions, different than the first and second sets of instructions, executing on the second hardware thread.

17. The one or more non-transitory computer-accessible storage media as recited in claim 16, wherein the one or more objects comprise a first object and a second object, wherein access to the first object requires a first privilege level, and wherein access to the second object requires a second privilege level.

18. The one or more non-transitory computer-accessible storage media as recited in claim 16, wherein the execution of the first set of instructions is scheduled by a task scheduler of an operating system executing on the one or more computer systems.

19. The one or more non-transitory computer-accessible storage media as recited in claim 16, wherein the first set of instructions implement an operation of a virtual machine executing on the one or more computer systems, and wherein the second set of instructions implement an operation of a hypervisor executing on the one or more computer systems.

20. The one or more non-transitory computer-accessible storage media as recited in claim 16, storing further program instructions that when executed on or across the one or more processors further cause the one or more computer systems to:
   generate an interrupt indicating that the second set of instructions is to be scheduled at the first hardware thread, wherein the interrupt is handled at the second hardware thread.

* * * * *